United States Patent
Learned et al.

(10) Patent No.: US 7,058,422 B2
(45) Date of Patent: Jun. 6, 2006

(54) METHOD FOR OVERUSING FREQUENCIES TO PERMIT SIMULTANEOUS TRANSMISSION OF SIGNALS FROM TWO OR MORE USERS ON THE SAME FREQUENCY AND TIME SLOT

(75) Inventors: Rachel E. Learned, Waltham, MA (US); Joseph Su, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 432 days.

(21) Appl. No.: 09/923,709

(22) Filed: Aug. 7, 2001

(65) Prior Publication Data

US 2002/0037737 A1 Mar. 28, 2002

Related U.S. Application Data

(60) Provisional application No. 60/233,870, filed on Sep. 20, 2000.

(51) Int. Cl.
*H04B 7/00* (2006.01)
*H04Q 7/20* (2006.01)

(52) U.S. Cl. .................. 455/526; 455/523; 455/503; 455/132; 375/341; 375/346; 714/795

(58) Field of Classification Search ............. 455/526, 455/132, 523, 503; 375/341, 346, 348, 350, 375/144, 148; 714/795
See application file for complete search history.

(56) References Cited

U.S. PATENT DOCUMENTS 5,790,606 A    8/1998   Dent
5,982,813 A   11/1999   Dutta
6,122,269 A    9/2000   Wales
6,198,775 B1   3/2001   Khayrallah
6,219,314 B1   4/2001   Versleegers
6,570,935 B1 *  5/2003  Sugita ..................... 375/324

OTHER PUBLICATIONS

Xiaodong Wang and H. Vincent Poor, "Iterative (Turbo) Soft Interference Cancellation and Decoding for Coded CDMA," IEEE Transactions on Communications, vol. 47, No. 7 Jul. 1999.
S. Verdu, Multi–User Detection, Cambridge University Press, 1998.

* cited by examiner

Primary Examiner—Nick Corsaro
Assistant Examiner—Shaima Q. Aminzay
(74) Attorney, Agent, or Firm—Daniel J. Long; Robert K. Tendler

(57) ABSTRACT

A system is provided for increasing the number of users capable of communicating over a wireless network to permit multiple users to transmit information simultaneously on the same channel or frequency in which a Viterbi decoder-based signal separation system is used to pull apart or uncorrupt the otherwise interfering signals on the channel. In one embodiment, two users are assigned to the same channel, with a joint parameter estimation pre-processor being utilized to provide an estimation of the power, time and frequency offsets and phase of the incoming signals. The joint parameters estimated by the parameter estimation unit are applied to a signal separator which recovers and pulls apart the two signals. The subject system is capable of accommodating more than two simultaneously transmitted signals to provide signal packing over existing channels without requiring new waveforms through the utilization of stripping techniques and tail chopping techniques so as to minimize the computational load involved in separating the signals.

12 Claims, 11 Drawing Sheets

METHOD FOR OVERUSING FREQUENCIES TO PERMIT SIMULTANEOUS TRANSMISSION OF SIGNALS FROM TWO OR MORE USERS ON THE SAME FREQUENCY AND TIME SLOT

This application claims the benefit of provisional application No. 60/233,870, filed Sep. 20, 2000.

FIELD OF INVENTION

This invention relates to communication systems and more particularly to a method and apparatus for uncorrupting or separating signals from multiple users transmitted simultaneously over the same frequency and in the same time or overlapping slot.

BACKGROUND OF THE INVENTION

It will be appreciated that wireless networks have of late become overloaded due to the increasing number of users seeking to communicate with the cell towers. Various communications schemes have been proposed in order to multiplex the signals so that a large number of users can communicate with a given cell tower. In general for analog phones, the analog system provides one communication channel per user. As a result the analog service has become quickly overloaded with the large number of users seeking access to a cell tower. In order to accommodate the overloaded conditions, time division multiplexing, TDMA, frequency division multiplexing, FDMA, and code division multiplexing, CDMA, have been utilized to accommodate many users per tower. By multiplexing is meant multiple access in which the number of users communicating with the cell tower are organized so as not to interfere with one another, allowing an equitable sharing of the channel resource.

The original premise for TDMA type systems was a 3 to 1 advantage which has in general been realized. CDMA systems have initially promised a 20 to 1 advantage, but practically have been able to realize only a 3 to 1 advantage.

Additionally, satellite communications have required a certain amount of multiplexing to be able to accommodate users seeking to communicate through satellite uplinks and downlinks.

While the above-mentioned techniques for providing multiple access have proved useful in accommodating the increasing number of users, the number of users for wireless services has increased beyond the capacity of present systems to be able to accommodate them.

What is therefore necessary is a system that can accommodate simultaneous transmission from multiple users on the same frequency sharing the same time slot or channel. In order to be able to do this a system is required which can uncorrupt or separate simultaneously received signals. Not only is such a system required, it is also a requirement that the descrambling or separation be not computationally complex so that the computation can be carried out by processors in hand-held wireless units.

By way of further background, the original inception of multiple access (MA) for the wireless medium was dictated primarily by the need for simple receivers. MA schemes have traditionally assigned user's waveforms and timing protocols for the sole purpose of eliminating or minimizing interference among the various users that simultaneously access a shared wireless channel so that a simple matched-filter receiver can reliably detect any signal of interest. Specifically, time division multiple access (TDMA), frequency division multiple access (FDMA), code division multiple access (CDMA) and hybrid schemes force signals to be orthogonal in which there is no interference whatsoever, e.g. different users are assigned completely different timeslots or nearly orthogonal wideband signals such that there is negligible interference between any two signals sharing the same bandwidth. These systems work well within the primary original motivating constraint, namely, lack of computing capabilities in the receiver. Bandwidth, on the other hand, was plentiful relative to the original appetite for throughput.

Many decades later, three trends impact wireless communication: 1.) computing capabilities have improved many fold, 2.) the requirement for information throughput has increased exponentially, and 3.) the bandwidth available for typical MA systems has decreased. The imposition of orthogonal signal assignment coupled with limitations in available bandwidth result in MA systems that fall far short in capacity or throughput for today's needs.

SUMMARY OF THE INVENTION

In order to uncorrupt or to separate simultaneously transmitted signals on the same frequency a Viterbi decoder is utilized to provide a shortest path procedure to pick a joint bit stream that has the highest probability of occurrence given the data received. In essence each of the two or more simultaneously transmitted signals has characteristics which can be ascertained which permit the separation of the signals and the descrambling thereof. It is the recognition that two simultaneously discretely modulated transmitted signals have enough identifying characteristics that makes possible their separation.

Two signals which arrive simultaneously on the same frequency and not having vastly different received powers appear so scrambled that neither of the signals is intelligible. In short, one signal appears as noise to the other signal and vice versa. It has been found in the subject invention that there is sufficient information on the simultaneously transmitted signals to perform signal separation through the utilization of a parameter estimation pre-processor and the utilization of techniques which shorten the exhaustive search done by a Viterbi decoder in the signal separation process, first by a hybrid stripping based on power and secondly by inter-symbol interference tail chopping for the formulation of the receiver detector/decoder algorithm.

Generally, the solution to the problem of increasing throughput without increasing bandwidth lies in the application of multi-user detection (MUD) theory. Multi-user detection is described in S. Verdu, Multi-user Detection, Cambridge University press, 1998, Chapter 4, which includes a detailed description of signal separation using an exhaustive search. This search analyzes all of the possibilities of data points when multiple signals are combined.

More generally, the premise behind multi-user detection is not to treat the "other user" interference as noise. Indeed, the interference is nearly entirely deterministic in that much is known about the interfering signals such as the symbol waveform, modulation scheme, and symbol rates. The multi-user detector takes advantage of all that is known at the receiver about each of the interfering digitally modulated signals.

It has been found that multi-user detection can: 1.) allow for robust operation of a communication link in the presence of other user interference, 2.) eliminate weak user dropout (the near-far problem) in a multiple access system employing "nearly orthogonal"signaling such as described in the IS-95 protocol, 3.) eliminate the need for power control to ensure that all signals are being received by the base station at the same power, and 4.) increase throughput since more simultaneous users can co-exist and transmit on the same frequency or channel since intentional interference is allowed.

The subject invention involves improvements made to the theoretical techniques of multi-user detection to solve the practical problems associated with increasing the number of simultaneous users for any actual commercial system that employs orthogonal signaling such as TDMA, FDMA or hybrid of the two. One such example system that employs orthogonal TDMA/FDMA is the cellular GSM system in use in Europe and elsewhere.

The present invention solves two challenges associated with the realization of MUD-based extensions to existing MA communication systems to allow for a many fold increase in user capacity.

First, in general, the optimal exhaustive search MUD that can be implemented with a Viterbi algorithm (shortest path algorithm) is exponential in complexity per bit decoded, meaning that the number of states per stage, MI(nK), is impractically large when n, the Inter-Symbol Interference (ISI) number, times K, the number of users is greater than 12. Thus, in a practical multi-user environment n×K could easily exceed 24 such that the complexity per bit decoded is many hundreds of gigaflops or floating point operations per bit. The largest handset computational capacity is on the order of megaflops which will not support an exhaustive multi-user search signal separator like that in Verdu, Chapter 4. As will be seen, the subject system reduces n by tail chopping. As to K, a grouping of signals based on power reduces K into two or more sub groups, with which each subgroup containing no more than k users, and for which n×K is not excessive.

Second, all previously proposed methods to reduce complexity either require that one design new waveforms that will deviate from existing specifications for existing and upcoming wireless systems, or allow ad-hoc interference as long as the interfering waveforms comprise a linearly independent set. The requirement of linearly independent waveforms does not hold if one were to over-pack a GSM cellular timeslot in a single cell or an ACES satellite timeslot in a single spot beam, for example.

Note that the subject system does not require the design of new waveforms and does not require the use of a linearly independent set in order to achieve over-packing for existing and proposed systems employing orthogonal signaling. Prior to the invention, such a method of over-packing would require the use of the computationally impractical exhaustive search optimal MUD detailed in the Verdu text.

The exponential complexity problem has been solved by improving the theoretical insights corresponding to multi-user detection for asynchronous linearly dependent signals with intersymbol interference to eliminate this impractical complexity.

The primary reason to reduce complexity is so that real time operation is possible with state of the art processors that can be inserted into current base stations, user phones, and other transmit/receive devices that may wish to employ the subject system.

Furthermore, the user phone or small device can tolerate only small increases in complexity relative to what a base station can tolerate. The present invention involves a way to pack existing signals into the available bandwidth in such a way as to allow for a MUD procedure that is as computationally simple. The subject small device receiver algorithm is as computationally simple as a state of the art receiver and can be accomplished in real time within present state of the art processing for handsets.

In one embodiment, the subject system consists of the following five core pieces:

1. An asynchronous over-packing scheme for channels in the reverse link (mobile to base, or small computing device typically associated with the user to big computing device typically associated with a controller). 2. A parameter estimation block that proceeds the signal separation block. 3. A signal separation block for the controller (e.g. in the base station receiver) that outputs the channel bits to be processed by the existing system elements such as de-interleaving and error correction decoding. 4. A synchronous packing scheme for the forward link (base to mobile or big device to little device). 5. A signal separation block for the user's device (e.g. mobile telephone) that outputs the channel bits to be processed by the existing system elements such as de-interleaving and error correction decoding.

A sixth power control scheme may be used for improving the bit error rate both on the forward and reverse links.

The packing scheme for reverse link channel is very simple. The controller simply assigns one or more users to the exact same channel. Thus, in a GSM system, the base station controller would assign all empty time slots to active users. If a new user requests a time slot, the controller assigns a time slot that is already occupied.

The parameter estimation block calculates estimates of each user's received power, baud timing offset, frequency offset, and oscillator phase. The controller, during acquisition with a new user, sends the received acquisition signal to the preliminary parameter estimation sub-block which computes maximum likelihood estimates for received power, baud timing offset, frequency offset, and oscillator phase. This information is then conveyed to the parameter refinement sub-block which refines the estimates of these parameters for the new user as well as the existing user or users in the shared time slot.

The signal separation block consists of an algorithm which automatically alternates between two modes of operation within the receiver. It reverts to a simple stripping procedure whenever possible when relative received signal powers are favorable to stripping. Whenever stripping is not capable of giving the required bit error rate, the receiver reverts to an inter-symbol interference (ISI) tail-chopped version of the optimum asynchronous multi-user detector. For more than two users, a hybrid between the ISI chopped optimum multi-user detection and stripping is used.

When the powers of the recovered signals are less than 6 dB apart, tail chopping is used to reduce computational complexity. The stripping procedure has the lowest complexity of all multi-user detection procedures, but suffers from bad bit error rate unless the received powers are greater than 6 dB apart in which the highest power signal dominates.

The subject inter-symbol interference tail-chopped exhaustive search is an improvement over the optimal exhaustive MUD detailed in the Verdu text, and achieves a substantial reduction in complexity by reducing the number of states per stage in the Viterbi decoder used for finding the maximum likelihood joint sequence. It does so by ignoring the presence of inter-symbol interference tails in the formulation of the optimum exhaustive search MUD.

For two or more users packed within the same channel, the grouped hybrid method is employed. This method groups signals into families according to their received power. In one embodiment, the lowest power signal in one family must be 6 dB higher than the highest power signal in the next lowest power family. The ISI-chopped exhaustive search MUD is performed on one family at a time, starting with the highest power family and working down in power order. After a bit stream is produced for each user in that family, the received signals are recreated using the entire signature pulse for each user in that family without the ISI tails chopped. This recreated interference signal is then subtracted from the original received signal to create an interference-reduced signal. Note, that prior to recreation of the interference signal, the bit streams may be corrected by applying the appropriate error correction if feasible. The above MUD-remod-strip procedure is repeated until all signal families are detected and/or decoded. This block requires all parameters estimated in the parameter block, along with the total number of users sharing each channel.

As to tail chopping, tail chopping merely requires providing the replica of a user's signature pulse without tails to the extensive search multi-user detector. Note that when constructing the trellis (Viterbi decoder) that performs the exhaustive search to determine the optimal set of bit streams associated with the received signal comprised of the aggregate of a number of interfering signals, one must provide a replica of each user's signature pulse, and it is this signature pulse which is provided with tails removed to the Viterbi decoder.

When one provides the complete pulse over its entire non-zero duration, which is typically more than 6 bit durations for K interfering signals, the resulting Viterbi decoder will have $M^{(Kn)}$ states per stage, where M corresponds to M-ary modulation (e.g. M=2 is binary phase shift keying), K is the number of interfering users, and n is the ISI number (e.g. the number of bit durations for which the signature pulse is non-zero).

The computational complexity required for the Viterbi decoder to search all possible paths corresponding to all possible bit combinations is proportional to the number $M^{(Kn)}$ which is the number of states per stage of the trellis.

In order realize a significant reduction in computation required per bit, in the subject invention, a tail-chopped version of each user's signature pulse is provided to the exhaustive search multi-user detector. In the case where one chooses to set the pulse to zero beyond the rth bit duration, where r<n, one now has an exhaustive search via a Viterbi decoder with a reduced number of states per stage in the trellis, namely $M^{(Kr)}$.

When the user signals are being received with similar powers, this tail chopping causes negligible degradation in the performance of the, now suboptimal, exhaustive search multi-user detector, but provides the desired bit streams with a significantly lower complexity.

In the case where the received signals are separated by a larger power difference, such as 6–7 dB, the error rate in the bit stream associated with the lower power user is significantly degraded by using the tail-chopped version of the exhaustive search multi-user detector.

To solve this degradation problem, the subject invention uses a power ordered stripping technique. When the power separation between highest power signal and the remaining signals is greater than 6 dB then the highest power signal is stripped off with a full tail, with lower power signals having tails chopped in the formulation of the Viterbi-decoder-based search to eliminate complexity that these tails cause in the optimal signal separation process.

Thus, in the more general case of making use of stripping to reduce the complexity consider to the case where any two power-adjacent received signals are separated by a large amount, e.g. 6 dB. In this case one reduces the complexity by stripping off the group of higher power signals, thus reducing the number, K, of interfering users expected by the exhaustive search multi-user detector. Specifically, one tells the exhaustive search multi-user detector that there are only I users, the number of users in the highest power grouping. In effect, one has decided to treat all other users as background noise. Once these users have been decoded, they are recreated with full ISI tails and stripped from the received signal to create an interference-reduced signal, e.g. an estimate of what would have been received if none of the I signals in the highest power grouping were present.

Since the other users are all much lower in received power, e.g. 6 dB lower than the lowest power user in the higher power grouping, this sub-optimal assumption causes negligible degradation to the bit error rates of the users in the high power grouping.

The benefit of tail chopping and iteratively stripping off users is that the computational complexity required is at least an order of magnitude lower since the complexity required is only on the order of $M^{(IR)}$ computations per bit decoded. This is significantly smaller than $M^{(Kn)}$ since I<K and r<n.

Once the decoded bits associated with the I users in the highest power grouping have been decoded, the signals are reconstructed using the full signal with the full tails covering n bit durations and the reconstructed full signals are subtracted from the received signal. One now has an estimate of the received signal that does not include the I users in the highest power grouping. The process is then iterated, detecting and stripping off the next highest power group of signals until there are no more signals left.

In one embodiment, the power grouping is done by the parameter estimation block. The parameter estimation block must determine each user's power as part of its function. It then orders the users by power. Once ordered, the users are grouped together according to power families for which there must be a large power difference, e.g. 6 dB, between the lowest power user in one family and the highest power user in the next lower power family.

If there are only a total of two users, then the power grouping would either separate the two users in to two "groups" if there was 6 dB or greater difference between them, or group them together in one grouping if there was not.

As to the forward link, the subject synchronous packing scheme for the forward link allows for a simple signal separation procedure in the user device. Here, the subject system takes the ability to perform an orderly signal packing in the controller prior to sending the signal out to the forward channel. This is useful in that any timing or phase offsets are known by the handset prior to parameter estimation.

Note that, the separation algorithm block within the user device may be same as that in a base station.

As a further improvement a power control scheme can be implemented to control the power at the handsets to provide for groups of received signals based on power levels to permit more rapid processing by, in effect, reducing K into sub-groups of smaller k's.

The primary benefit of supersaturated communications is a significant increase in the throughput of existing cellular, PCS, and satellite multiple access communication systems, as well as systems currently being designed for future use such as next generation cellular, local wireless loop, and wireless local area networks for wireless internetworking of devices or appliances.

In summary, a system is provided for increasing the number of users capable of communicating over a wireless network to permit multiple users to transmit information simultaneously on the same channel or frequency in which a Viterbi decoder-based signal separation system is used to pull apart or uncorrupt the otherwise interfering signals on the channel. In one embodiment, two or more users are assigned to the same channel, with a joint parameter estimation pre-processor being utilized to provide an estimation of the power, time and frequency offsets and phase of the incoming signals. The joint parameters estimated by the parameter estimation unit are applied to a signal separator which recovers and pulls apart all the signals assigned to the same channel. The subject system is capable of accommodating simultaneously transmitted signals to provide signal packing over existing channels without requiring new waveforms through the utilization of stripping techniques and tail chopping techniques so as to minimize the computational load involved in separating the signals.

BRIEF DESCRIPTION OF THE DRAWINGS

These and other features of the subject invention will be better understood in connection with the Detailed Description in conjunction with Drawings of which.

DETAILED DESCRIPTION

Figure 1:
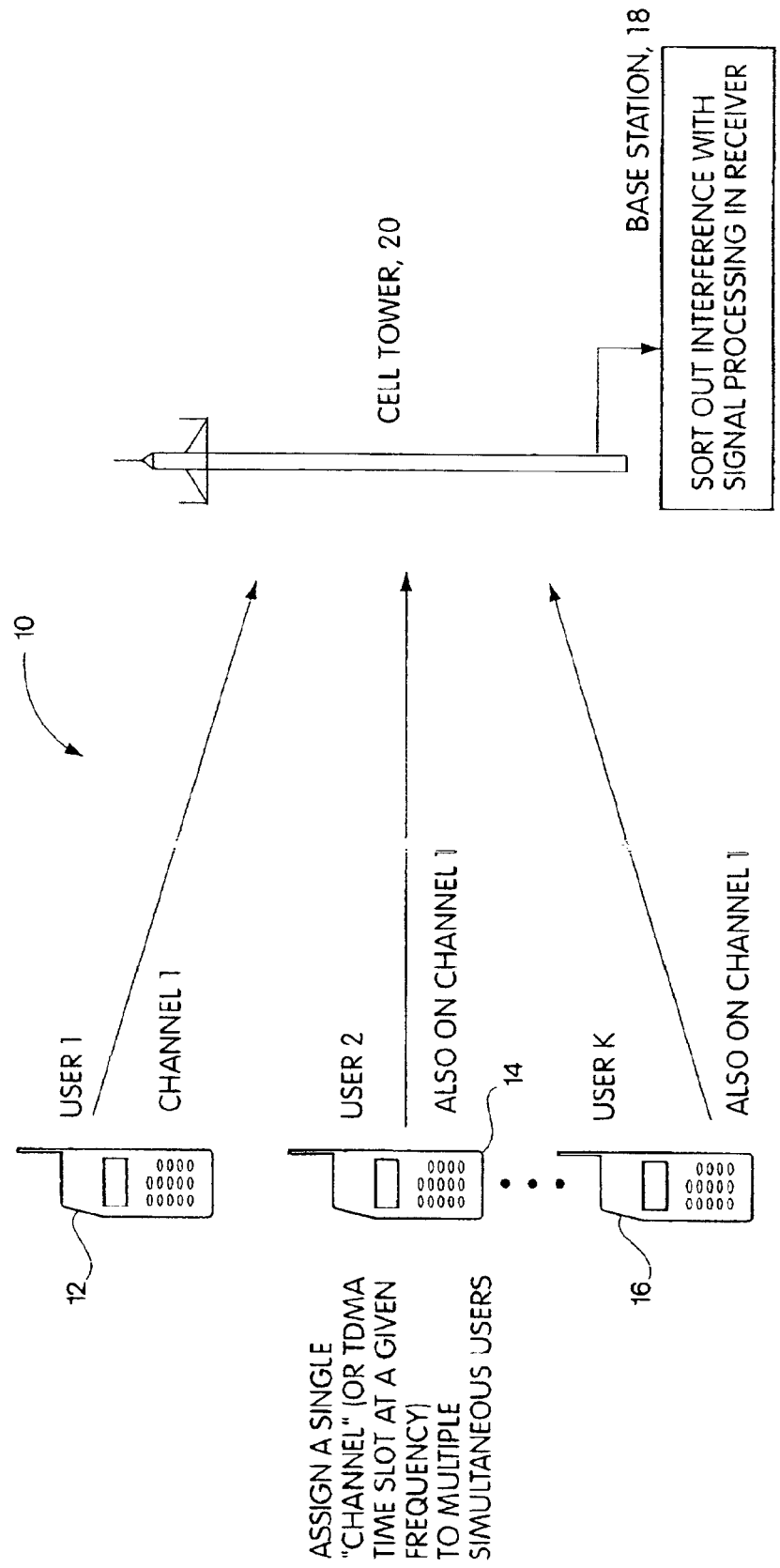
FIG. 1 is a diagrammatic illustration of multiple wireless users simultaneously communicating with a cell tower on a single frequency or channel, with the received signals being sorted out at a base station by signal processing to uncorrupt the interfering signals.

Referring now to FIG. 1 what is shown is a typical GSM system in which in-phase and quadrature components of the transmitted signals are recovered to provide a bit stream which conveys the information transmitted. Here a network 10 is utilized to transmit the information to and from multiple users 12, 14 and 16 and a base station 18 through a wireless communication network to and from a cell tower 20. The ability to overuse frequencies is depicted by a situation in which there are multiple simultaneous users all assigned to a single channel or TDMA time slot at a given frequency. Thus User 1 transmits on Channel 1, as does User 2 and all other users assigned to that channel, up to User K. It is the purpose of the subject system to sort out the interfering signals with signal processing at the receiver, in this case at the base station. It will be appreciated that identical processing is carried out in each of the handsets so that full duplex, two-way communication can be achieved by multiple users on both the forward and reverse channels. By so doing, the channel capacity of a tower, a satellite or other transmit/receive point can be augmented by the amount or the number of users that can simultaneously utilize a given channel.

Figure 2:
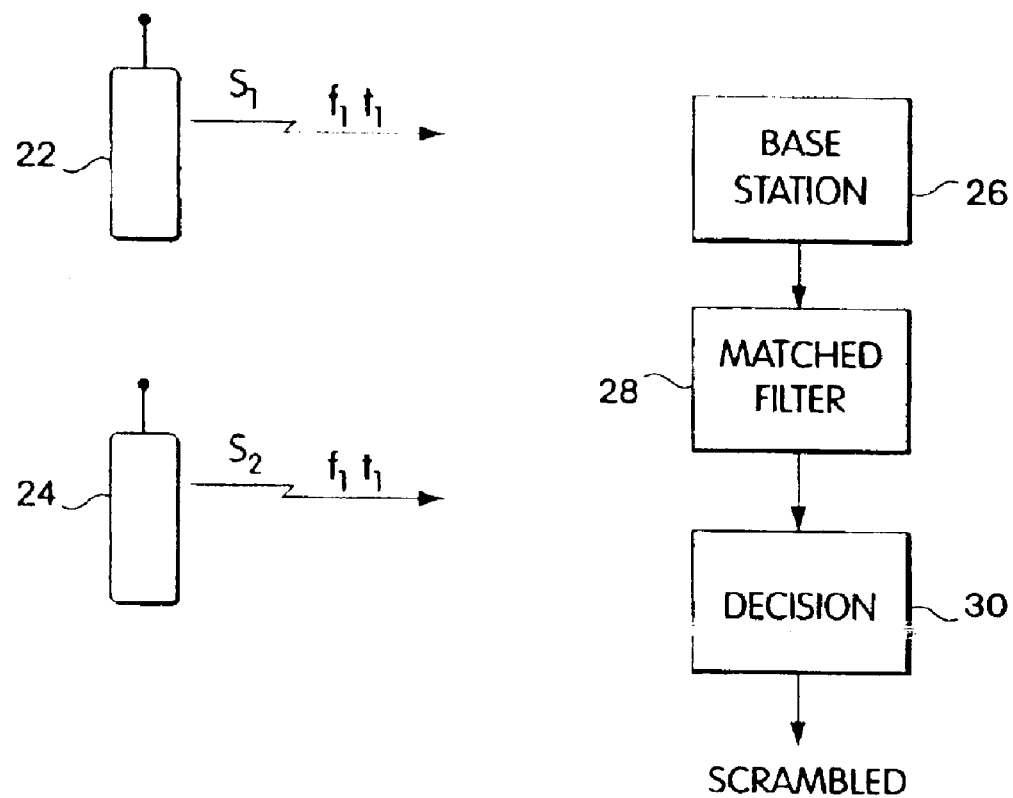
FIG. 2 is a diagrammatic illustration of two signals sent at the same time on the same frequency and in the same time slot if TDMA is used, with the result being a corrupted or scrambled and undecipherable result.

Referring to FIG. 2, if two users, here illustrated at 22 and 24, were to simultaneously transmit information over the same frequency, a base station 26 coupled to a matched filter 28, in turn coupled to a decision unit 30 would provide as an output hopelessly corrupted signals. The reason is that the individual signals would be interfering with each other. In present systems, signals are intentionally coordinated to avoid interference because if one signal were to interfere with another signal and if no attempt was made to remove interference or to disambiguate the signals, the demodulated signal is corrupted beyond recognition.

It has been found, however, that there is a significant amount of information carried by each of the signals which can be utilized to identify the signals and to separate them to provide intelligible information.

Figure 3:
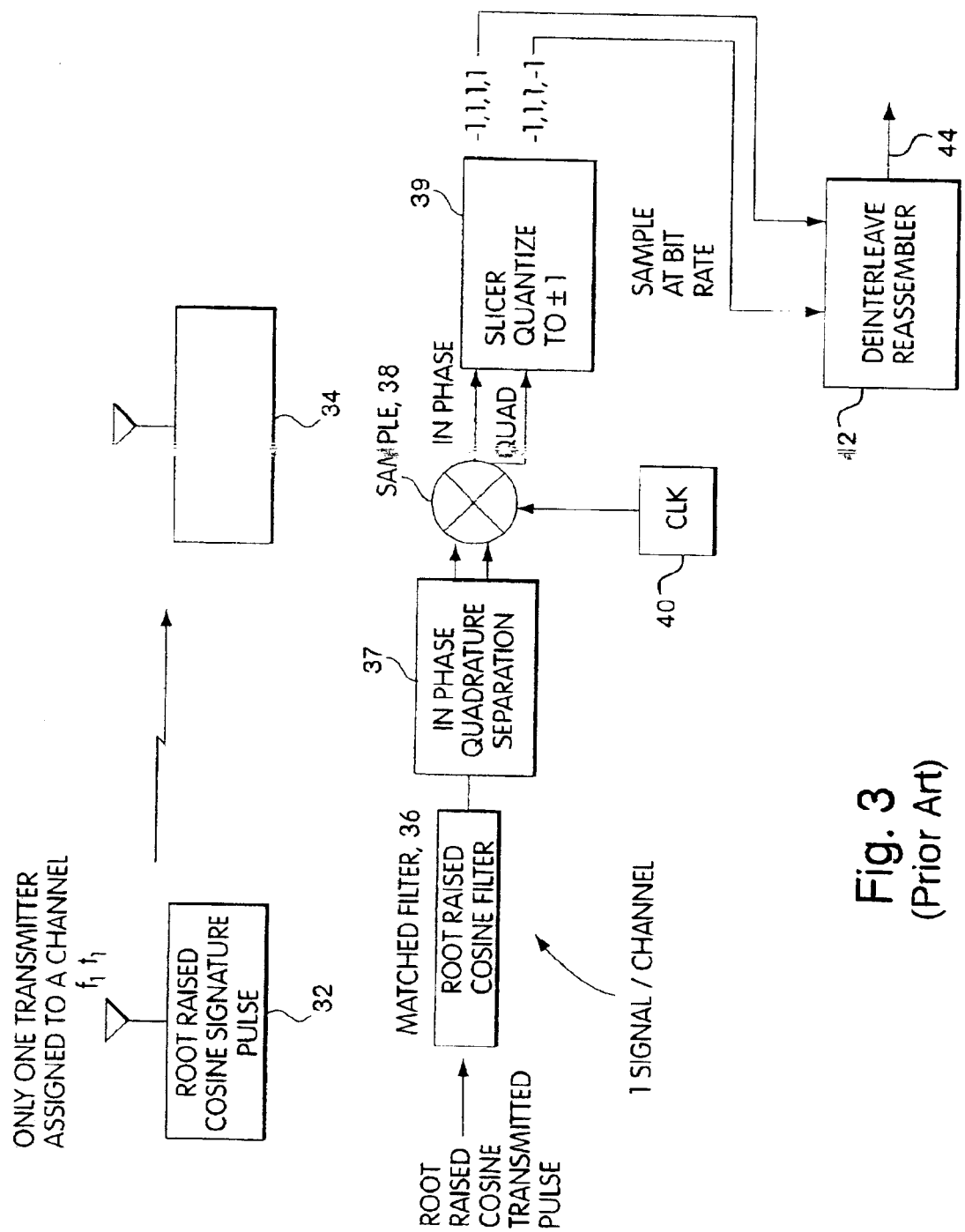
FIG. 3 is a diagrammatic illustration of a prior art system in which digitally encoded in-phase and quadrature signals are detected using matched filters typically having a root-raised cosine filtering characteristic in which the in-phase and quadrature components are sampled at the bit rate to provide either +1 or −1, with the sign of the bits conveying the transmitted information.
Figure 4A:
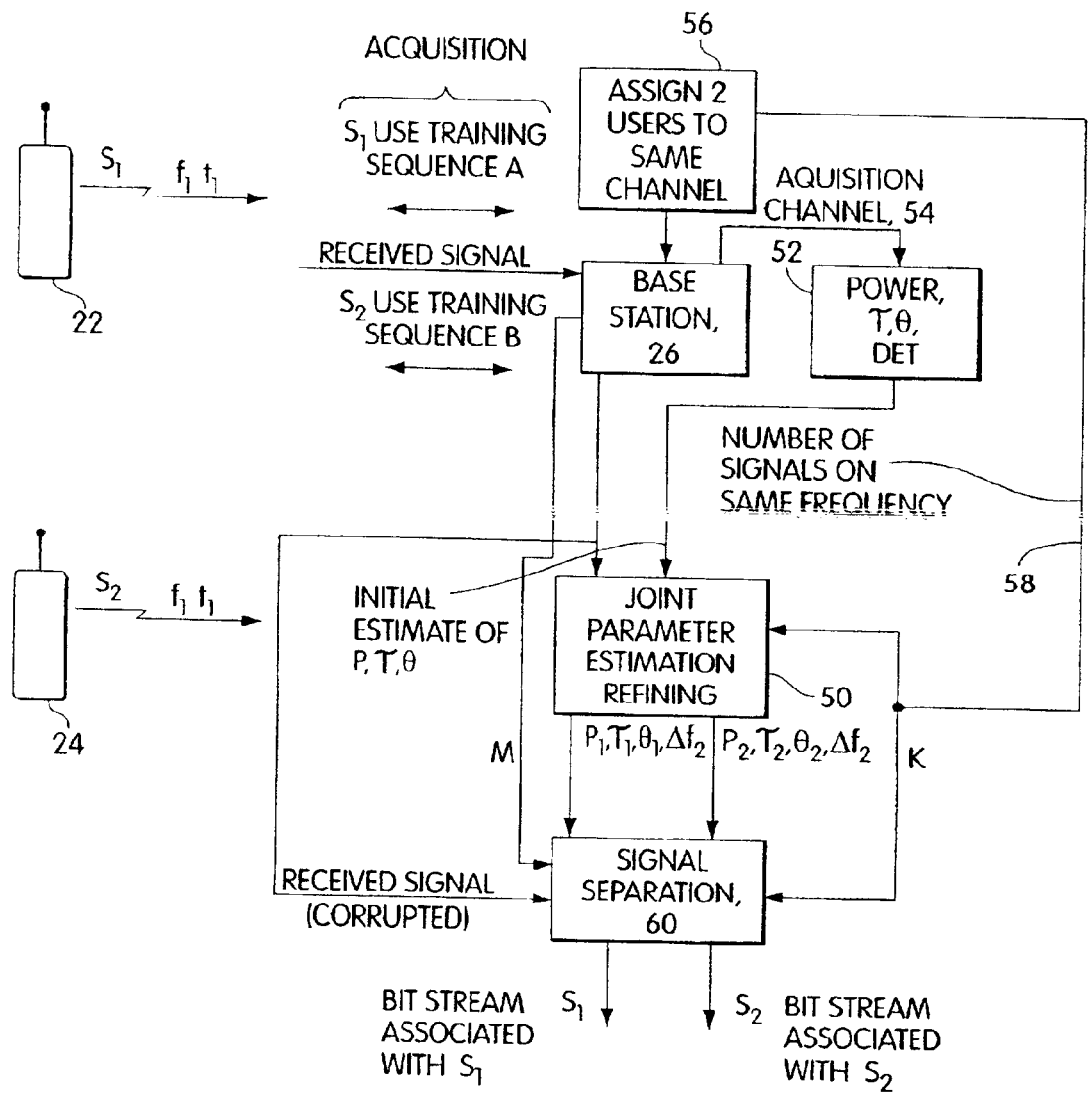
FIG. 4A is block diagram of the present invention illustrating the transmission of two signals simultaneously on the same channel or frequency to a base station in which the individual signals are separated by first using a joint parameter estimation unit and providing these parameters in refined form to a signal separation unit which utilizes a Viterbi detector, an exhaustive search, and a method to limit the exhaustive search by ISI tail-chopping and stripping techniques.

Referring now to FIG. 3, the case is illustrated where there is one signal per channel. Here a transmitting source 32 transmits to a receiver 34 utilizing an in-phase, quadrature modulation scheme with a root raised cosine transmitter filter. A matched filter 36 is provided with a root raised cosine filter. This is followed by 37 in which they are separated, then in-phase and quadrature components sampled at 38 and in-phase and quadrature sample streams in which the information is carried in the sign of the samples. In the illustrated example the bits are either –1 or 1, with the in-phase and quadrature signals from the matched filter being sampled by clock 40 at the bit rate. These in-phase and quadrature signals are then supplied to an interleave re-assembler 42 which results in a demodulated output 44 corresponding to recovered in-phase and quadrature components of the modulated signal. Referring now FIG. 4A, in one embodiment, in the subject system two or more simultaneous signals are transmitted from handheld units 22 and 24 to a base station 26. Here, the output from the base station is supplied to a joint parameter processing unit 50 which seeks to recover all relevant parameters of both signals in terms of power, offset and oscillator phase. As will be described, processor 50 may provide these joint parameter estimates through an estimation process. As illustrated at 52, a power, offset and phase detector is utilized to provide an initial estimate of parameters from signals on the acquisition channel. Note, that detector 52 operates by calculating the parameters during the acquisition phase in which the new transmitter sends its signal over the control channel 54 without any interference from other users in that channel.

It will be appreciated as illustrated at 56 that base station 56 assigns two users to the same channel, with the number of signals on the same frequency 58 being derived therefrom. This information is passed to the joint parameter estimation processor 50 and signal separator 60 so that the appropriate estimations are provided to signal separation unit 60.

Figure 4B:
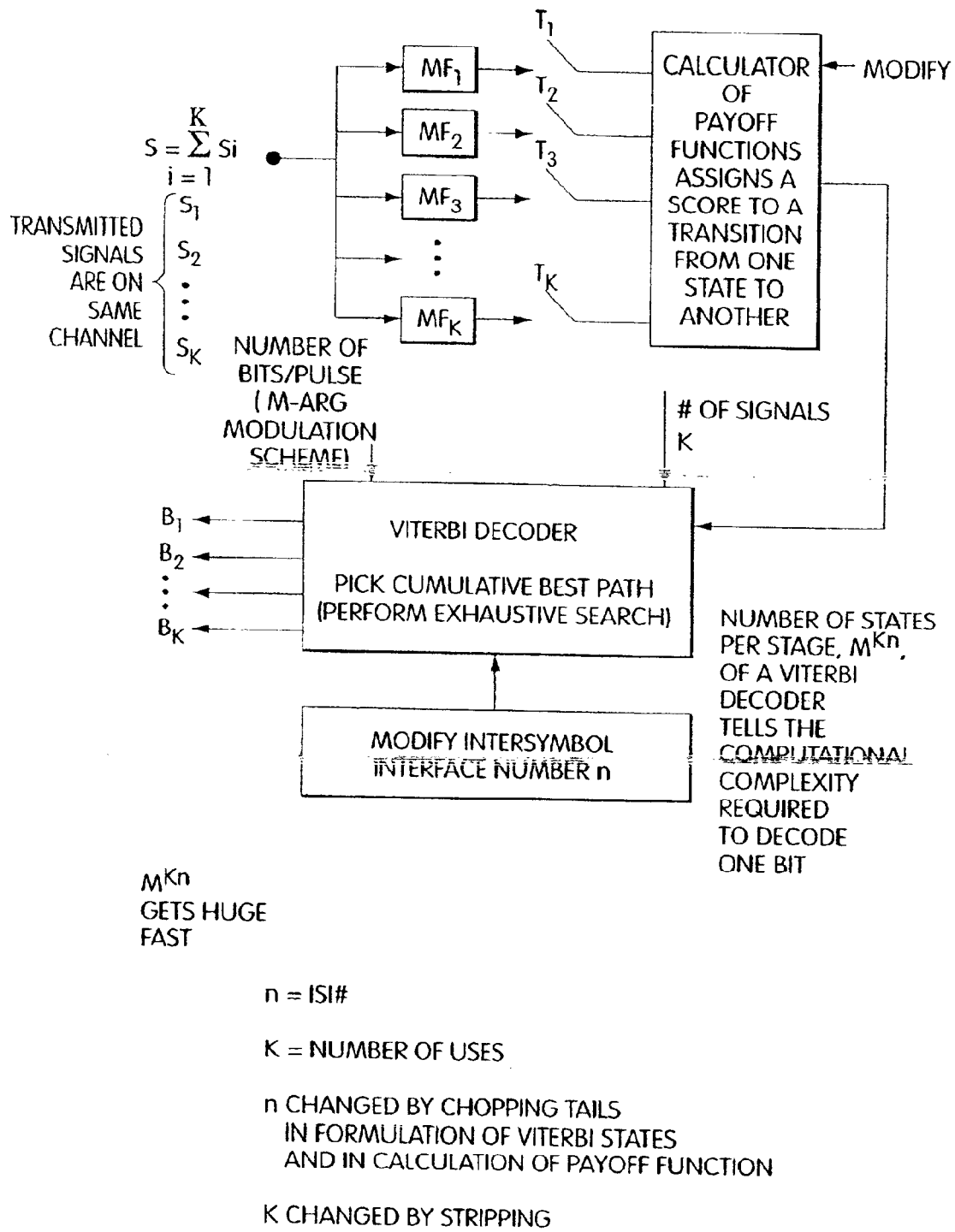
FIG. 4B is a detailed block diagram illustrating an implementation of the multi-user detection system of the present invention.

The output of the base station, namely the scrambled signals, are coupled to signal separation unit 60, the operation of which will be described hereinafter. Utilizing the power, offset and phase estimations, signal separation unit 60 disambiguates or recovers the data streams corresponding to the two signals based on multi-user detection techniques. It employs an exhaustive search algorithm which, in essence, runs through all the possibilities of data points in a received constellation and determines which data points belong to which signals. The ability for this algorithm to sort out the various data streams from the corrupted received signal is due in part, to the different powers, offsets, and phases. As can be seen in FIG. 4B, the description of multi-user detection is in accordance with the Verdu text, Chapter 4.

The minimum bit error rate multi-user detector can be implemented by a dynamic programming algorithm that carries out an exhaustive search of all possible bits streams for all interfering users jointly to ascertain the most likely bit stream for each user. Having assigned bit streams to users means that the transmitted information corresponding to each interfering user is separated. The exhaustive search carries out two independent iterations each of which requires a computational effort proportional to the number of stages and to the number of states per stage $M^{Kn}$. Therefore the complexity per bit is on the order of $M^{Kn}$.

It will be thus appreciated that the exhaustive search algorithm utilized to determine which of the data points pertain to which of the interfering signals requires an extensive amount of computation power. In general, multi-user detection has been accomplished with relatively massive computers. Such intense computations cannot presently be carried out by the CPUs within handsets or within the base station. It is therefore important to be able to cut down on the exhaustive search in order to be able to implement the signal separation bits in a handheld unit and in real time at the base station.

Figure 5:
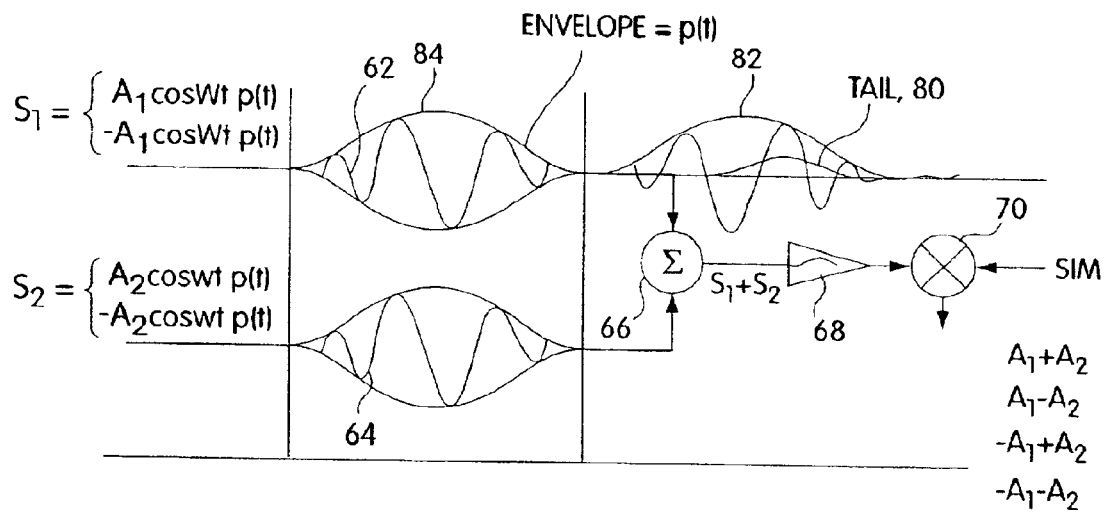
FIG. 5 is waveform illustrating the existence of identical signals and the effect of a tail of a preceding portion of the signal.
Figure 6:
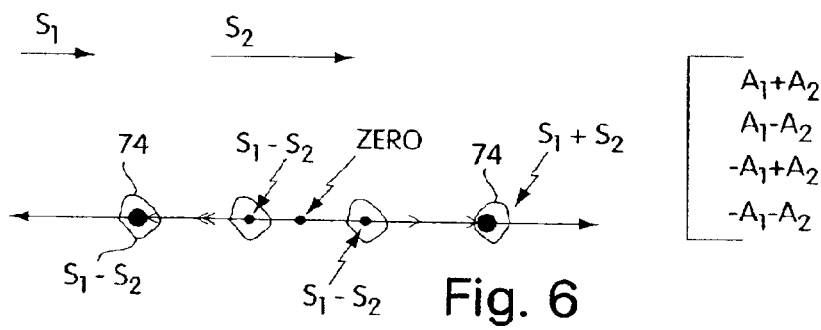
FIG. 6 is a of vector diagram illustrating the result of combining 2 BPSK in-phase detected signals, illustrating regions of uncertainty as to the data points.
Figure 7:
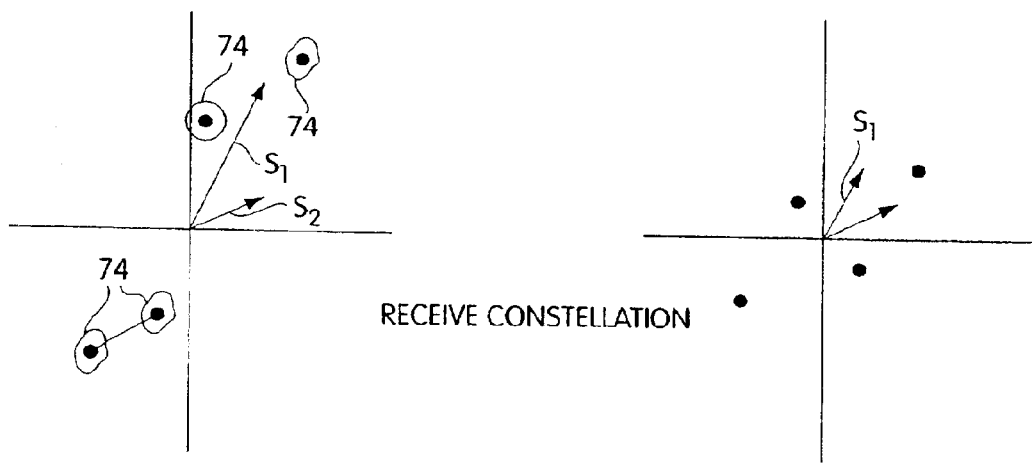
FIG. 7 shows two vector diagrams for two different signal realizations for $\{S_1, S_2\}$ of the received constellation illustrating in two dimensions the uncertainty of the data points in the received constellation which is the result of the detection of simultaneous signals on the same channel or frequency but with arbitrary relative phases.

Referring now to FIG. 5, how the computational reduction is accomplished is now described using a simplified example. It will be seen that two waveforms 62 and 64, having identical phases, exist in respective envelopes, are summed as illustrated at 66 and are extracted by filter 68 and then sampled at 70. The result has four possible values $+A_1+A_2$, $+A_1-A_2$, $-A_1+A_2$, or $-A_1-A_2$. These components can be plotted as data points in a received constellation and as illustrated in FIGS. 5, 6 and 7 where each shows a different phase and power relationship between the two signals. There is a certain amount of uncertainty as to these data points due to background and receiver noise as illustrated at 74.

It is the purpose of the exhaustive search, in effect, to be able to provide an estimate of the actual data point in the received constellation and it is this search that must be heavily curtailed or refined so as to reduce the computational load.

One of the contributors to the total number of the data points to be searched is the length of the inter-symbol interference tail, here illustrated at 80, which will be seen to exist from a latter portion of the signal 84 and is interfering with the main portion of pulse 82.

As one of the aspects of the subject invention, this tail is ignored to provide a more amenable number of data points in the received constellation. Specifically, this corresponds to less states per stage in the search trellis or Viterbi decoder.

It will be appreciated that the effect of the tail of one user on the succeeding main portion of the pulse corresponding to the other user is power dependant. For instance, if the power of the signal which is interfering is relatively low compared to the highest power signal, then the effect of ignoring the lower power signal tail is minimal on the exhaustive search process results pertaining to the highest power signal. On the other hand, the effect of ignoring the high power signal tail is catastrophic on the results of the exhaustive search that pertain to the lower power signal. If both signals are received at relatively similar powers, then ignoring the tails causes only negligible increase in the size of the uncertainty cloud around each point in the constellation, while dramatically reducing the total number of points that must be searched. What this means is that the exhaustive search need not go through a tremendous number of possibilities in order to assign a data point to a given signal if ISI tails can be ignored.

Figure 8:
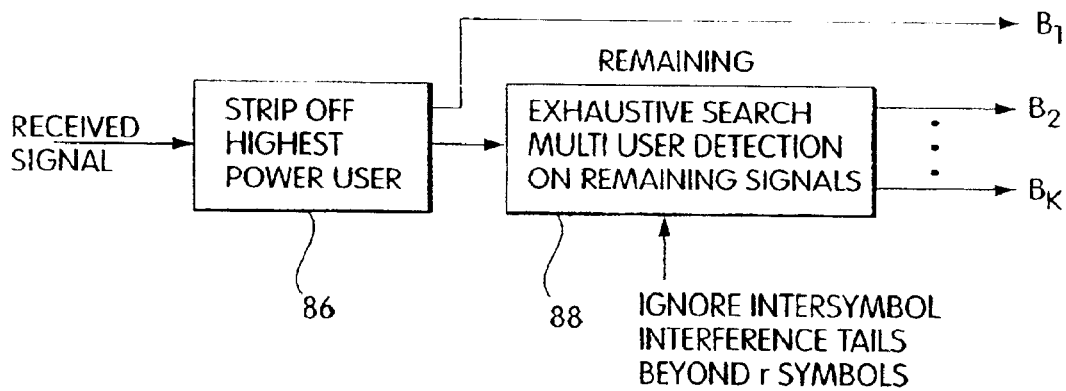
FIG. 8 is a block diagram illustrating one technique for decreasing the computational complexity of signal separation in which the signal representing the highest power user is stripped off, if it is more that 6 dB higher in power than the second highest power signal. This is followed by processing the remaining signals with an exhaustive search multi-user detection algorithm in which inter-symbol interference tails beyond r symbols are ignored.

The two techniques of ignoring inter-symbol interference tails beyond r-symbols, r<n, and the use of a stripping technique to strip off the highest power user or group of users are illustrated in FIG. 8. Here the simplest rendition is shown for which the highest power user is stripped off at 86 prior to the exhaustive search multi-user detection being performed, as illustrated at 88. It will be appreciated that in the exhaustive search multi-user detection inter-symbol interference tails beyond r bit durations are ignored. The combination of the stripped-off highest power user and the ignoring of the tails reduces the computation load by, in general, at least five orders of magnitude in the recovery of the various bit streams, here illustrated by $B_1$ and $B_2 \ldots B_k$.

Figure 9:
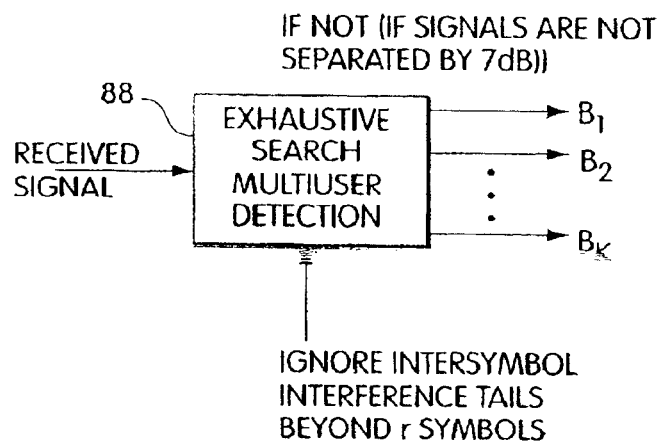
FIG. 9 is a block diagram illustrating that if the interfering signals are not separated in power by a pre-determined amount (e.g. 6 dB), then an exhaustive search multi-user detection technique is applied.

As illustrated in FIG. 9, if the signals are of the same power, there is no stripping and the exhaustive search multi-user detection 88 is performed, again ignoring interference tails.

Figure 10:
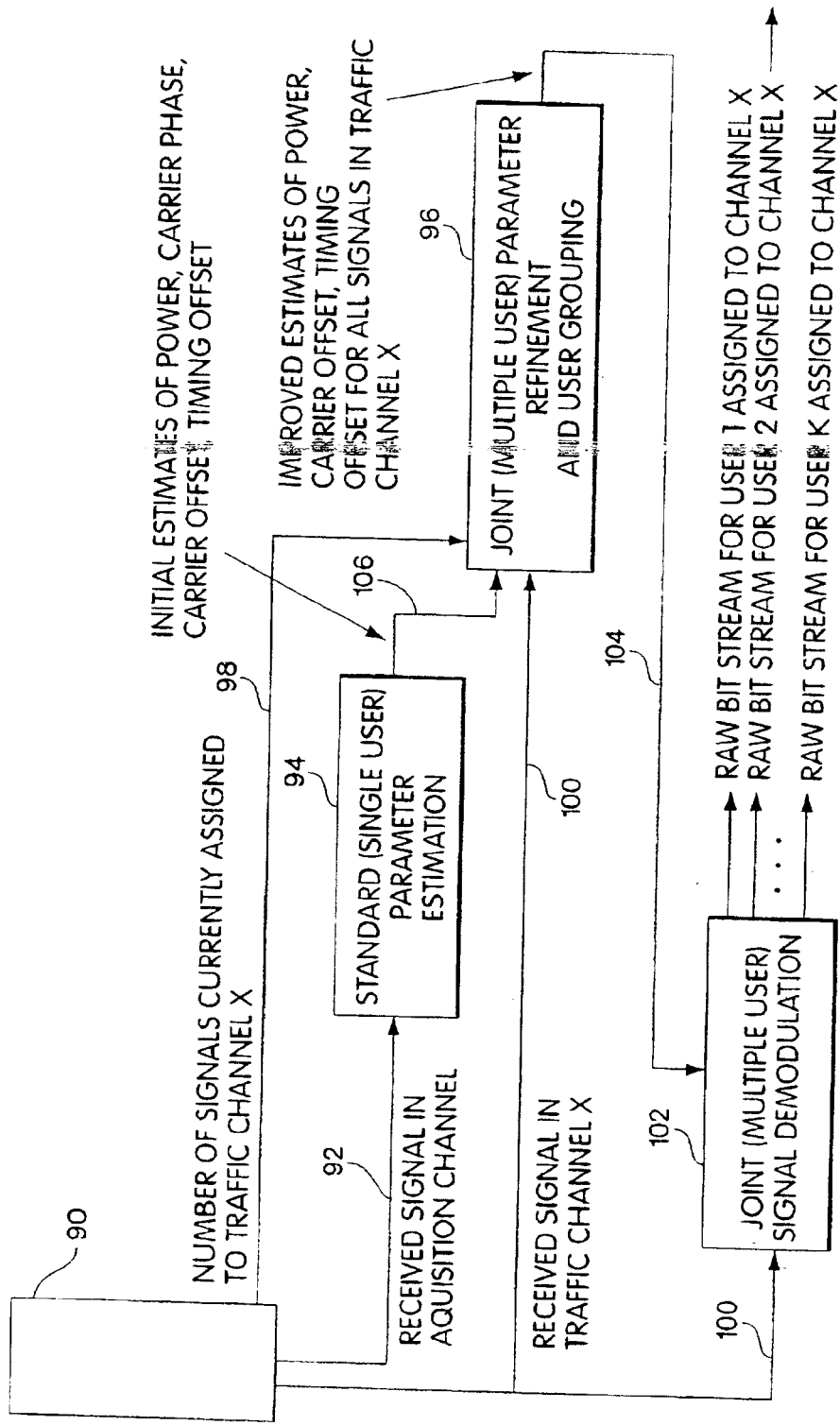
FIG. 10 is a block diagram illustrating that the number of signals currently assigned to a traffic channel is utilized in joint multiple-user parameter refinement along with single user parameter estimates and the received signals to provide parameters to the joint multiple-user signal demodulation section.

Referring now to FIG. 10, more particularly, base station controller 90 provides the received signal in the acquisition channel over line 92 to a standard single user parameter estimation unit 94 which is in turn coupled to a joint multi-user parameter refinement and user grouping unit 96. Also, an input to unit 96 is the number of signals currently assigned to traffic channel X as illustrated by line 98.

The received signal in traffic channel X is delivered over line 100 to unit 96 and to a joint multiple-user signal demodulation unit 102 which requires the output 104 of the parameter refinement and user grouping unit.

Note that the standard single user parameter estimation unit is coupled to the joint parameter refinement and user grouping unit 96 via a line 106 which provides to this unit initial estimates of power, carrier phase, carrier offset, and timing offset. The output of the joint multiple-user parameter refinement and user grouping unit is a set of improved estimates of power, carrier offset, and timing offset for all the signals in traffic channel X. These five parameters and user groupings are utilized by the joint multiple user signal demodulation unit so as to be able to output a raw bit stream for user 1, user 2 . . . user K, representing the separated signals.

It will be noted that unit 96, also functions to determine a grouping of the incoming signals in terms of their relative power.

It will be appreciated that the raw bits streams may be run through the remaining processing already present in the system such as the deinterleaving, error correction decoding and other filtering techniques.

Figure 11:
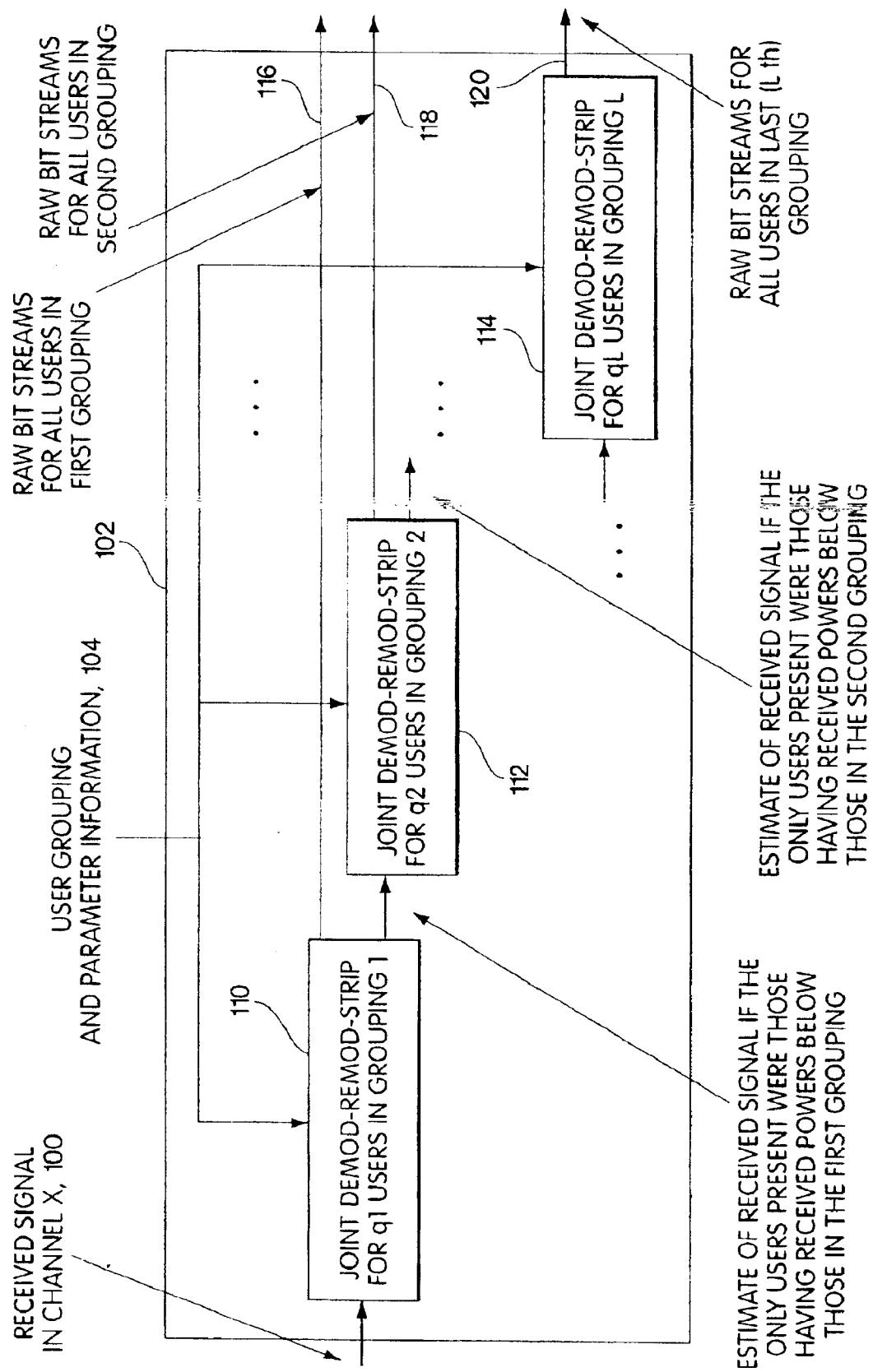
FIG. 11 is diagrammatic illustration of the utilization of stripping in which various groups of users are processed separately based on power.

Referring now to FIG. 11, the joint multiple user signal demodulation system is described. Here joint multiple user signal demodulation unit 102 has an input which is the received signal in channel X, here illustrated at 100. As will be seen, the received signal is applied to a joint demodulation, remodulation, stripping and user grouping unit 10 which in essence processes a first group of q1 incoming signals which have been grouped according to power.

The output of User Group 1 unit 110 is an estimate of the received signal if the only users present were those having received powers below those in the first grouping. This output is then applied to a joint demodulation, remodulation stripping unit for User Group 2 as illustrated at 112, the output of which, again, is an estimate of received signal if the only users present were those having received powers below those in the second grouping.

The process is iterative such that for all user groupings up to user grouping L the process continues until the signals are processed for user grouping L as indicated at 114. It will be noted that the output of each of units 110, 112 and 114 are raw bit streams for all users in the particular groupings. For instance, the output on line 116 is the raw bit stream for all q1 users in the first grouping, on 118 the raw bit stream for all q2 users in the second grouping and on line 120 the raw bit stream for all qL users in the last grouping.

Figure 12:
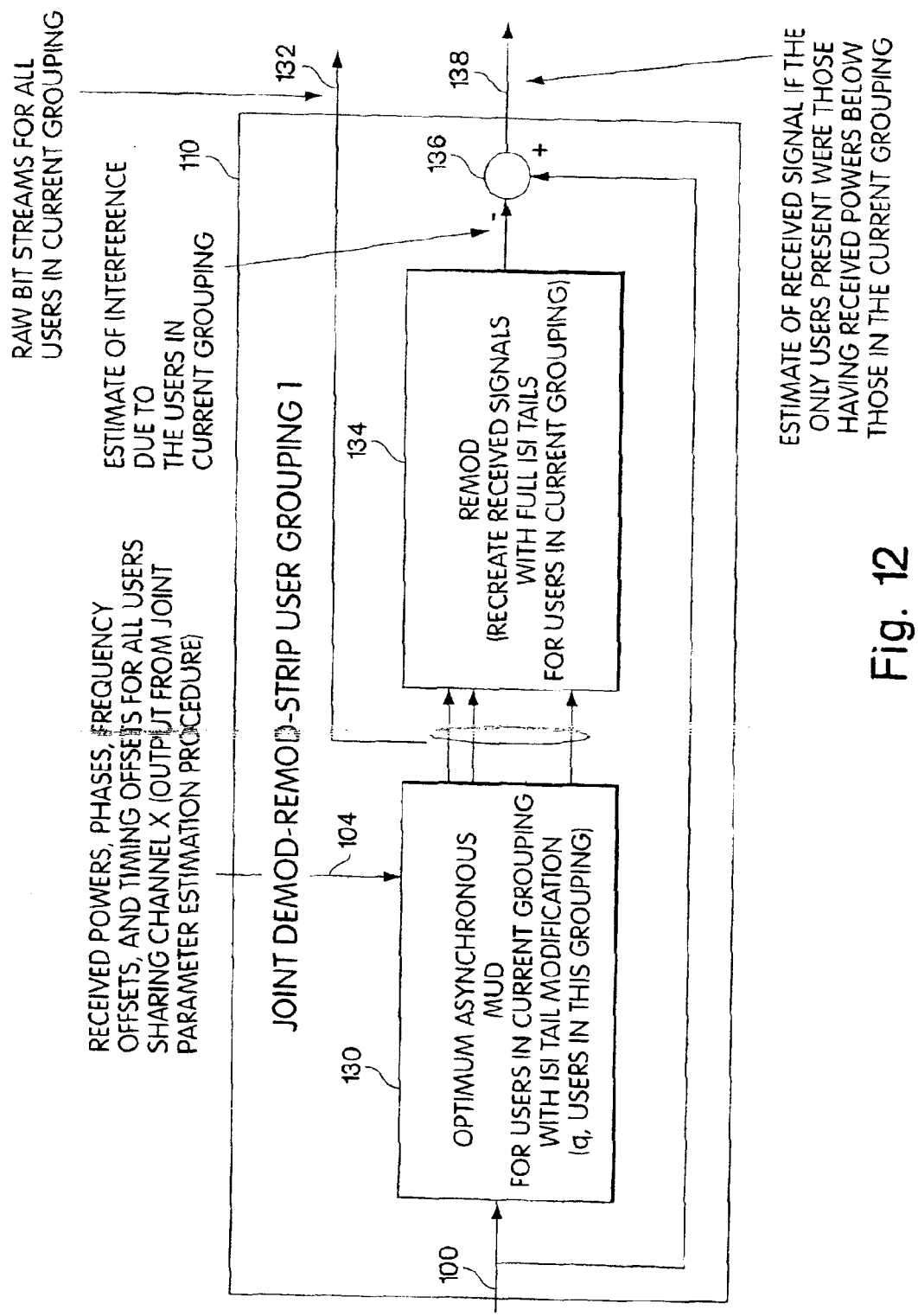
FIG. 12 is a diagrammatic illustration of the utilization of inter-symbol interference tail modification in the formulation of the optimum asynchronous multi-user detector, followed by remodulation which recreates received signals with full inter-symbol interference tails for users in the current grouping so as to achieve an estimate of the received signal if the only users present were those having powers below those in the current grouping; and, FIG. 13 is a block diagram illustrating the joint parameter estimation process.

Referring now to FIG. 12, the operation of a joint demodulation, remodulation and stripping unit is described.

Here input signal 100 is applied to an optimum asynchronous multi-user detector 130 for a user in a current grouping, in this case the first grouping. This unit also takes into account ISI tail modifications.

The optimum asynchronous multi-user detector or MUD 130 is the unit which performs the multi-user detection utilizing the techniques described in Verdu, Chapter 4 and in this case ignores the existence of intersymbol interference tails that exists beyond the appropriate number of symbols, say, r. This is done to significantly reduce the computational complexity of the exhaustive search provided in this unit.

As indicated in Chapter 4 of Verdu, the multi-user detection algorithm requires the knowledge of received powers, phases, frequency offsets, and timing offsets for all users sharing the channel which is the output from the joint parameter estimation procedure. In addition, user-grouping information is also passed over line 104 to unit 130.

From this information unit 130 determines the q1 signals to be processed and the K−q1 signals to be ignored at this stage. By grouping together a small subset, q1, of the total number of users, K, one reduces the complexity of the optimum asynchronous multi-user detection and results in complexities $M^{q1 \times r}$ where q1 is the number of users in this first sub-group. Recall that r is used to denote the reduced ISI number which is less than n, the actual ISI number.

It will be appreciated that the output of unit 130 is a raw bit stream for all users in the current grouping as illustrated on line 132, whereas another output of unit 130 is applied to a unit 134 which remodulates and recreates received signals with full ISI tails for users in the current grouping.

The purpose of unit 134 is to recreate the received signal that would be present when the only users transmitting are those associated with the first grouping. Note that each user's signal is recreated with the full extent of ISI tails. This operation is accomplished at 136 such that the output at 138 is an estimate of the received signal if the only users present were those having received powers below those in the first grouping.

It will be appreciated that the signals at output 138 are those which correspond only to a smaller number of transmitting signals. For example, if FIG. 12 were to represent the joint demod-remod-strip block associated with the first user grouping, output 138 would correspond to only K−q1 users.

It will be appreciated that block 110 is repeated in order to stepdown a number of users so that the computational complexity of the optimum synchronous MUD is significantly reduced. The overall result is to reduce the computational complexity by at least five orders of magnitude when power grouping is possible.

It will be appreciated that in order for the optimum synchronous multi-user detection unit to operate properly, it is important that the inputs thereto be accurate in terms of the receive powers, phases, frequency offsets and timing offsets of all of the users sharing the channel.

In essence there are two ways in which to estimate the above parameters. The first is an apriori way of estimating the parameters as illustrated by unit 94 which assumes a single user exists in the acquisition channel. Unit 94 performs a simple parameter estimation based on the signals in the acquisition channel. It will be noted that when a phone is turned on, the phone must communicate to the base station over the separate acquisition channel prior to being assigned to a traffic channel. If a user is all alone, the parameter estimation unit 94 can ascertain power, timing offset and frequency offset with state of the art technology. It is these signals which can be utilized to establish apriori an initial estimate of the powers, frequency offsets and timing offsets of all users sharing the channel. This system of parameter estimation works because only a single user is allowed to transmit over the acquisition channel at any time.

It will be appreciated that only one user seeks to join the system at one given time. The result is that if one user is utilizing a given traffic channel and another user seeks to communicate with the base station, assuming that the base station has run out of available traffic channels, the second user can have its parameters ascertained in the above manner and then be connected over the same traffic channel. This is a continual process upon the access of an additional user on the traffic channel. Once a user hops off the acquisition phase over to the traffic channel, his or her parameters are refined. This is accomplished by unit 96 of FIG. 10.

Figure 13:
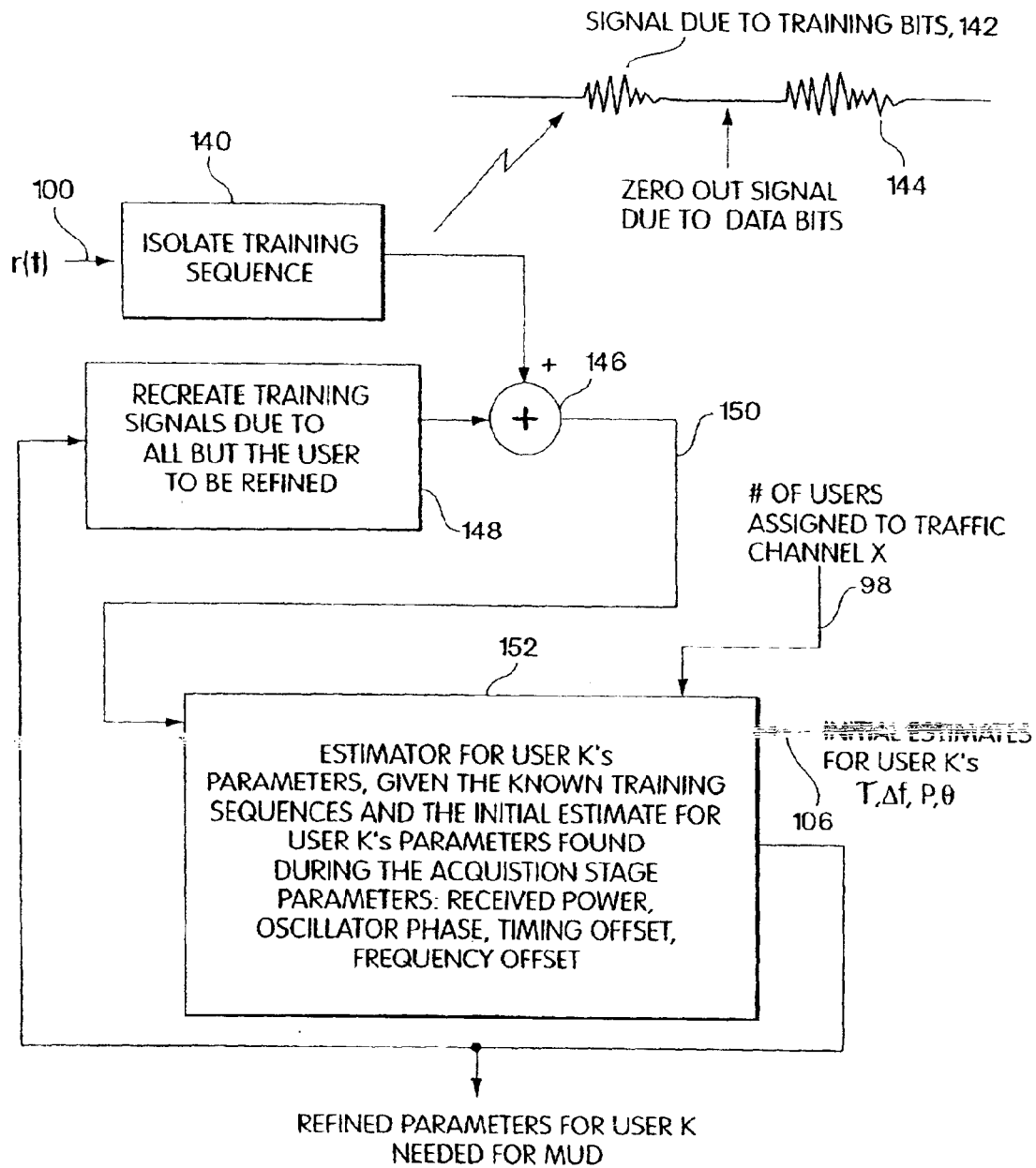

The joint multiple user parameter refinement and user grouping unit 96 calculates an estimate of phase and refines initial estimates of power, carrier offset and timing offset as illustrated in FIG. 13. While it is indeed possible to use unrefined parameters for signal separation, it is more useful to further refine these parameters so that a more robust signal separation can be accomplished by optimum asynchronous multi-user detector 130 of FIG. 12.

Referring now to FIG. 13, how the refinement is accomplished is now described: As can be seen, incoming signal 100 here illustrated by r(t) goes to a unit 140 which functions to isolate the training sequence portion of the corrupted signal. In one embodiment of the subject invention a training sequence is established during acquisition by base station 26 of FIG. 4A, which assigns a unique training sequence to each user that is assigned the same traffic channel. The system uses the training sequence to allow for tracking of bit timing offset, a frequency offset and phase. Thus during acquisition the base station communicates with the handset to synchronize its timing with that of the base station, and, in effect, with the timing of the other users already in the traffic channel that will also be assigned to this new user. This is accomplished traditionally in any TDMA based commercial cellular or satellite system. This training sequence is utilized additionally in the subject system to provide means of separating the individual signals so that one can ascertain refined parameter estimates.

Thus, as illustrated at 140, the received signals are isolated based on zeroing out of the portions of the signals corresponding to the data bits, leaving the portions of the signal relating to training bits only as an output. The training sequence portion of the received signal corresponding to the transmitted signals occupying traffic channel X is illustrated at 142 and 144, with the zeroing out of the signal due to the data portion of the received signal.

The output of unit 140 is applied to a summing junction 146. At 148, signals corresponding to the training sequence portion of all user signals that were previously assigned to same traffic channel are recreated.

Thus the output of 148 is an estimate of the training sequence portion of the received signal due to all of the users minus the newest. At 146, the estimate of the training sequence portion of all but the newest user is subtracted from the training sequence portion of the received signal that contains all users including the newest. The result, on 150 is an estimate of the training sequence portion of the received signal that would be present if only the newest user were to exist alone on channel X. This is applied over line 150 to a maximum apostiori estimator for a user K's parameters, given the known training sequences and initial estimates for user K's parameters found during the acquisition stage, namely received power, oscillator phase, timing offset and frequency offset. This is accomplished by unit 152.

It will be appreciated that the information over line 150 reflects what the received signal would have been during the training sequence portion if only the newest user were present. Thus the above processing appears to unit 152 as if the other signals were not there. Note, unit 152 takes up where unit 94 left off. It will be remembered that the standard single user parameter estimation unit 94 assumes that there was only one user per channel, which was true because in the acquisition phase, there is only one user per channel.

Now unit 152 utilizes the initial information based on the traffic channel and permits the refinement of parameters which are useful in separating the signals in the traffic channel.

In estimation theory, it is well known that the quality of the parameter estimates measured in error variance of the estimate is inversely proportional to the duration over which the parameter estimation process is allowed to continue. In short, the longer you look, the better the parameter estimates.

What therefore takes place in the estimator 152 is that given the number of users assigned to the traffic channel as illustrated over line 98 and the initial estimates for each user, namely timer offset, frequency offset, power and phase, as illustrated on 106, estimator 152 continues to run, finding the improved estimates of the parameters of all signals on the communications channel assigned until adequate quality is obtained. This is done by refining the parameters of each user one at a time, always giving preference to the newest user to join channel X, but taking turns to further refine each of the parameter sets corresponding to each user on channel X.

More particularly, the estimator operates as follows: The system initially takes in the prior estimates and puts them aside temporarily. Then it takes the interference adjusted signal 150 that corresponds to the training sequence portion of the signal transmitted by the new user only. It observes this signal over multiple burst periods, meaning a predetermined short time interval to be used to calculate another set of parameter estimates. In this predetermined interval or window, phase, power, timing offset and frequency offset is determined in exactly the same manner as illustrated at unit 94, FIG. 10. This assumes the training sequence noted above.

At this point, one has set aside the original estimates and, in addition, has a second set of estimates independent of the first set. The system averages the two to get a better estimate. This process is repeated, adding the new estimates based on the new intervals or windows with the appropriate weighting to reflect an evenly weighted average or giving a heavier weighting to more recent estimates. A maximum number of consecutive estimates is averaged iteratively until the desired accuracy is achieved.

It will be appreciated that the multi-user detector needs estimates as soon as possible, preferably in real time and cannot wait until such time as an extremely large number of averages have taken place. In the subject system, the parameter refining unit outputs refined estimates at one time, but then keeps refining the estimates over a longer period of time so that as the system continues to operate, the estimates will become more and more refined, while at the same time providing real time estimates to the multi-user detector. Once a good quality estimate has been made for the newest user to join channel X, block 148 switches over to subtract out all but one of the older user's signals on channel X so as to allow a parameter refinement associated with this user. This process is repeated so that all users parameters are refined in turn.

It will be appreciated that as one continues to average over successive time intervals, there will become a collection duration when an optimal averaging takes place for the given system. At this time, estimates based on prior collection intervals arc tossed off or removed so that the estimation becomes as current as possible given the changes in the signals over time. This is referred to here as tracking. Thus the estimator 152 refines the parameter estimates with a sliding window of collected data so as to allow the estimates to vary with time. In addition, at any given point in time, up to date estimates of any of the K users assigned to channel X are being sent over 106 to the signal separation block as well as being fed back into 148. The final result is that, on as close to a real time basis as possible, high quality parameter estimates are fed over 106 to the signal separation block.

It will be appreciated that not only is the above parameter estimator useful in the separation of the signals which are simultaneously assigned to a given traffic channel, the estimator is also useful for every kind of multi-user detector which attempts to separate interfering signals, intentionally made to interfere or not. Thus the maximum apostiori estimator is used for not only the multi-user signal demodulation system described as the preferred embodiment hereof, it may be utilized in any case where any type of multi-user detection or stripping of signals is required.

As a further aspect of the subject invention, the subject system can be made to operate even better through a power control scheme in which the power of an individual hand-held units is more carefully controlled to enhance the performance of the signal separation block. The parameter estimator can therefore function to provide estimates of the powers of the individual signals so that their power can be carefully controlled in a closed loop overpacked system.

Source Code for the subject hybrid multiuser detector is now presented:

Hybrid Multi-user Detector:

```
Mud_demod.m
function mud_demod(paramflag,demoflag,nbit,mud_demod)
%mud This program implements the MUD algorithm.
% Inputs: traffic out of the downlink and an estimated parameter file.
%    The traffic file is called bfn_dChOut.mat, and the estimated
%    parameter file is called bfn_estParams.mat, where bfn stands for the
%    base file name chosen by the user in inParams.m.
%INPUTS
%   paramflag: When set to 1,use output from the parameter estimation routin
%           When set to 0, use the grouth true
%           Defaulted to 0 (since the parameter estimate is not quite perfect yet)
%   demoflag: When set to 1, the viterbi save the state in the surviving path;
%           When set to 0, the viterbi save the bit sequence in the surviving path
%           to save memory for running case with more than 2 users
%           Defaulted to 1
%   nbit: When set to inf, process the entire file.
%           When set to K (integer) process only K stage for quick look on the
%           the large case scenario.
%           Defaulted to inf;
%   mud_demod: hybrid or demud only
%
%
%   K_est is a scalar integer representing the estimate of K (number of transmitters in
%       the signal).
%   tau_est is a K_est by 1 vector of floating point estimates of the burst delay (tau)
%   T_est is a K_est by 1 vector of integer estimates of T (stagger offset).
%   dChOutData is the signal out of the downlink channel module. It is a 1 by L vector of
%   floating point time samples.
%
%OUTPUTS
%    demodOutData ia a K_est by L matrix of floating point time samples.
if nargin < 1 % when not specified by user set demoflag to be 0
    paramflag=0;
    demoflag =1;
    nbit = inf;
    mud_demod=1;
elseif nargin < 2 % when not specified by user set demoflag to be 0
    demoflag =1;
    nbit=inf;
    mud_demod=1;
elseif nargin < 3 % when not specified by user set femoflag to be 0
    nbit=inf;
    mud_demod=1;
elseif nargin < 4 % when not specified by user set demoflag to be 0
    mud_demod=1;
end
demoflag
paramflag
```

-continued

```
nbit
mud_demod
%INITIALIZATION
global batchMode baseFileName
system_constants_init; % get global system variables
if isempty(batchMode)
    batchMode=0;
end
mFilePath=pwd;
cd ..
if exist('ouputFiles')~=7
    mkdir('ouputFiles');
end
cd outputFiles;
outPath=pwd;
% LOAD ESTIMATED PARAMETER FILE
if batchMode~=1
    [filename,pathname]=uigetfile('*_estParams.mat','Select an Estimated Parameter File');
    baseFileName=strtok(filename,'_');
    cd(pathname);
    filename=sprintf('%s%s_estParams.mat',pathname,baseFileName);
else
    if exist(baseFileName)~=7
        mkdir(baseFileName);
    end
    cd(baseFileName);
    pathname=[pwd'\'];
    % when parameter estimate is ready
    filename=sprintf('%s%s_estParams.mat',pathname,baseFileName);
end
%LOAD SIGNAL FILE
sigfilename=sprintf('%s_dChOut.mat',baseFileName);
load(sigfilename,'dChOutData');
if nbit ~= inf
    dChOutData=dChOutData(1:nbit*4); % debugging purpose
end
L = max(size(dChOutData));
cd(mFilePath);
[bitinfo,tau_est,A_est,K_est,sidx,signal_delay,T,TSC,unbias_tau]=premud(filename,L,para
mflag);
%
% echo these
T
TSC
unbias_tau
% record the index for later use (bitinfo can be altered)
keep = zeros(size(bitinfo));
small=size(keep,1);
startidx = zeros(K_est,1);
for ik = 1:K_est
    keepidx = find(bitinfo(:,ik)==2);
    small = min(length(keepidx),small);
end
keep = keep(1:small);
% replace training bitinfo with regular data effeectively turn off the training debug
%bitinfo(find(bitinfo))=2;
bitinfo(find((bitinfo ~=3)& bitinfo))=2; % jo add bit type of 3 as transition bit for corrlation
outPath=[outPath '\' baseFileName];
if mud_demod % hybrid mud and demud mode
% THE MEAT OF THE PROGRAM GOES HERE
[maxA,maxIdx]=max(abs(A_est));
thr=.5*maxA;
nogo=0;
newset=[ ];
for i=1:length(A_est),
    if i~=maxIdx,
        if(abs(A_est(i))>thr),
            nogo=1;
        end
        newset=[newset i];
    end
end
if~nogo,
    rrcos=sqrtrcos(L_HALF,ROLLOFF,FB,SAMPLERATE);
    rrcos = rrcos(:).';
    rx_filter_delay = (length(rrcos)-1)/2;
    mf=conv(dChOutData,conj(flipud(rrcos(:))));
    phase=[conj(A_est(maxIdx));conj(j*A_est(maxIdx))]./abs(A_est(maxIdx));
    ioffset=signal_delay+rx_filter_delay+1+round(tau_est(maxIdx)*4);
```

-continued

```
        k=1;
        i =ioffset:4:length(mf);
        Y = zeros(1,length(i));
        for i=ioffset:4:length(mf),
          if bitinfo(k,maxIdx)= =3,
               temp=phase(1);
               phase(1)=phase(2);
               phase(2)=temp;
          end
          if bitinfo(k,maxIdx)= =0,
               A=0;
          else
               A=phase(mod(k-1,2)+1);
          end
          Y(k)=real(A*mf(i));
          if Y(k)>0,
               Y(k)=1;
          end
          if Y(k)<0,
               Y(k)=-1;
          end
          k=k+1;
        end
        I=find(bitinfo(:,maxIdx)= =0);
        II=I(find(diff(I)>1))+1;
        if(I(1)~=1),
             II=[1 ;II];
        end
        st=signal_delay+tau_est(maxIdx)*4+1;
        for i=1:length(II),
             ed=II(i)+NUM_BURST_BITS-1;
             if II(i)>=length(Y),
                    break;
             end
             if ed > length(Y),
                    ed=length(Y);
             end
             s=oqpskmod(Y(II(i):ed),SAMPLERATE,rrcos)*sqrt(2);
             sd = A_est(maxIdx)*s;
             x=st+(II(i)-1)*4-24:st+(II(i)-1)*4-24+length(sd)-1;
             if x(length(x))>length(dChOutData),
                    III=max(find(x<=length(dChOutData)));
                    x=x(1:III);
                    sd=sd(1:III);
             end
             if~isempty(x),
                   I=find(x>0);
                   dChOutData(x(I))=dChOutData(x(I))-sd(I);
             end
        end
        A_est=A_est(newset);
        tau_est=tau_est(newset);
        bitinfo=bitinfo(:,newset);
     end
     if~isempty(A_est),
[demodOutData2,multiplex_bitinfo]=asyncmud(dChOutData.',A_est,tau_est,bitinfo,
signal_delay,demoflag);
     end
     if~nogo,
         if isempty(newset),
               demodOutData2=Y;
         else
               demodOutData2=[demodOutData2;zeros(1,size(demodOutData2,2))];
               for i=size(demodOutData2,1):-1:maxIdx+1,
                    demodOutData2(i,:)=demodOutData2(i-1,:);
               end
               demodOutData2(maxIdx,:)=Y(1:size(demodOutData2,2));
          end
     end
else % demud only mode
     rrcos=sqrtrcos(L_HALF,ROLLOFF,FB,SAMPLERATE);
     rrcos = rrcos(:).';
     rx_filter_delay = (length(rrcos)-1)/2;
     mf=conv(dChOutData,conj(flipud(rrcos(:))));
     for iusr = 1:K_est
          phase=[conj(A_est(iusr));conj(j*A_est(iusr))]./abs(A_est(iusr));
          ioffset=signal_delay+rx_filter_delay+1+round(tau_est(iusr)*4);
          k=1;
          i =ioffset:4:length(mf);
```

```
            availbit = length(i);
            if iusr = = 1 % the least delay is the longest use it to allocate space
                    demodOutData2= zeros(K_est,startidx(1)+availbit-1);
            end
            Y = zeros(1,length(i));
            for i= ioffset:4:length(mf)
                    if bitinfo(k,iusr)= =3,
                            temp=phase(1);
                            phase(1)=phase(2);
                            phase(2)=temp;
                    end
                    ifbitinfo(k,iusr)= =0,
                            A=0;
                    else
                            A=phase(mod(k-1,2)+1);
                    end
                    Y(k)=real(A*mf(i));
                    if Y(k)>0,
                            Y(k)=1;
                    end
                    if Y(k)<0,
                            Y(k)=-1;
                    end
                    k=k+1;
            end
            %demodOutData2(iusr,startidx(iusr)+(0:length(Y)-1)) = Y;
            demodOutData2(iusr,(1:length(Y))) = Y;
    end % for iusr
end
% stripping training tailing and zero bits
L2 = size(demodOutData2,2); % demod is row oriented
[maxdelay, usrmax] = max[keep(1,:));
tmp =find( keep(:,usrmax)<=L2);
L1 = tmp(end);
demodOutData=zeros(K_est,L1);
% reorders as the orignal order
for ik = 1:K_est,
    demodOutData(sidx(ik),:) =demodOutData2(ik,keep(1:L1,ik));
end
rawber =NaN;
txbitfilename=sprintf('%s_txBitsOut',baseFileName);
cd(outPath);
load (txbitfilename)
if exist('rawTxBitsOut')
    % do mud error analyiss prior to channel decoding
    % encode and precode data bits
    % decode enough to do analysis
    txbitfile=sprintf('./%s_txBitsOut.mat',baseFileName);
    load (txbitfile);
    compare_length = min( max(size(rawTwBitsOut), . . .
        max(size(demodOutData)));
    % in number of bits
    tusr=size(rawTxBitsOut,1)
    pusr=K_est
    if tusr ~=pusr
            disp('Warning # estimate users is not equal to truth # users');
    end
    minusr = min(tusr,pusr);
    rawber = cumsum( . . .
(rawTxBitsOut(1:minusr,1:compare_length)~=demodOutData(1:minusr,1:compare_length)).');
    % in fraction
    for icol = 1:size(rawber,2)
        rawber(:,icol) = rawber(:,icol) ./ (1:compare_length).';
    end
    figure;plot(rawber,'*');
    disp('RAW BER in Fraction');
    rawber(compare_length,:)
            disp('RAW BER in Bits');
            rawber(compare_length,:)*compare_length
end
%SAVE TRANSMITTER OUTPUT DATA
outFileName=sprintf('%s_demodOut',baseFileName);
save(outFileName, 'demodOutData');
    % auxiliary information for debugging
    auxFileName=sprintf('%s_demodOut_aux',baseFileName);
    save(auxFileName, . . .
            'paramflag','demoflag','nbit', . . .
            'bitinfo','tau_est','A_est','K_est','sidx', . . .
            'T','TSC','unbias_tau', . . .
```

```
                    'rawber');
cd(mFilePath);
premud.m
function [bitinfo,tau_est,A_est,K_est,sidx,signal_delay,T,TSC,unbias_tau]=
premud(fname,L,paramflag)
% function premud(fname)
% preprocessor for MUD; generate bit info neeed by MUD
% paramflag 1:takeinfo from parameter estimate output
% paramflag 0:take info from parameter file
%
system_constants_init; % get global system variables
if~paramflag % using truth parameter file
      basefname=strtok(fname,'_');
      parafile = sprintf('%s.mat',basefname);
      gainfile = sprintf('%s_trueAOut.mat',basefname); % file contain actual gain
      %load parafile to get frame information
      %if exist(['./OutputFiles/',parafile]) ~= 2
      %if exist(['./',parafile]) ~= 2
      if exist(parafile) ~= 2
            %disp(['./',parafile,'missing']);
            disp([parafile,'missing']);
            bitinfo=[ ];
            return;
      else
            % using actual as estimate value for tau and gain
            %load(['./OutputFiles/',gainfile]);
            %load(['./',gainfile]);
            load(gainfile);
A_est=A*2; %% this accounts for multiply by sqrt(8) -- samples between unit-energy
raised cos pulses
                  %% and divide by sqrt (2) -- making the complex waveform
            % normalize A according to How A is generate
            rrcos = sqrtrcos(L_HALF,ROLLOFF,FB,SAMPLERATE);
            % now that everything is base on unit energy no normalization
            % is need for Amplitude so comment the next line
            %A_est=4*A_est*sqrt(rrcos'*rrcos);
            %A_est = SAMPLERATE*A_est./sqrt(SAMPLERATE);
            %load(['./',parafile]);
            load(parafie);
            K_est =K;
            % FM (Field Matrix)
            % L (Data Length in Samples)
            % T stagger offset
            %-------------------------------------------------------------
                  % This block move out of if loop to shared with non parafile case
                  %offset=T(:)*39+tau(:);        % tau and staggler offset
                  %[offset,sidx] = sort(offset);
                  %signal_delay = round(offset(1)*SAMPLERATE) % in sample
                  %offset = offset - offset(1); % make everyone reference to earliest one
                  %A_est = A_est(sidx);
                  %[tau_est,bitinfo] = frameinfo(offset,L,FM,TSC);
                  %-------------------------------------------------------------
                  %
      end
else            % use estimate parameter output
      est_file = fname;
      %if exist(['./',est_file]) ~= 2
            if exist(est_file) ~= 2
            %disp(['./',est_file,'missing']);
            disp([est_file,'missing']);
            bitinfo=[ ];
            return;
      else
            load(est_file);
            dim = size(A_est); % record matrix dim now; A_est got altered soon
            dBthreshold = -7; % user specified
            % right now assume all the 32 slot has the same parameters
            % determine user from only the first time slot
            AdB =20*log10(abs(A_est(:,:,1))); %% uses first time slot to estimate all A's and tau's
            AdB =AdB-max(max(max(AdB)));
            % find any above x db, but not more than 3, because mud.m takes too long for K>3
            idx= fine(AdB > dBthreshold );
            K_est = length(idx);
      if K_est>3
            fprintf('Initial estimate of number of users = %d\n',K_est);
            fprintf('This will be limited to 3 users, to conserve computing resources\n');
      end
      while K_est>3
            dBthreshold=dBthreshold+0.1;
```

```
            idx= find(AdB > dBthreshold );
            K_est = length(idx);
        end
    end
    %disp(['Number of User estimate:',num2str(K_est)]);
    A_page1 = A_est(:,:,1);
    tau_page1 = tau_est(:,:,1);
    A_cst=A_page1(idx);
A_est=A_est*2; % this is necessary for normalization due to gains in oqpskmod.m
    tau =tau_page1(idx);
    %map column oriented indx return by find back to Ndim idexing
    idxN = mapidx3(idx,dim); % map idx back to 3 d to derive T and TSC
    T = zeros(K_est,1);
    TSC = zeros(K_est,1);
    for i = 1:K_est;
        TSC(i)=TSCset(idxN(i,1));
        T(i)=idxN(i,2)-1;
    end
    % need to get FM from parameter estimated
    % The current version of parameter estimate every slot is filled
    % so just hardcode the FM as all ones
    FM = ones(K_est,32);
end
end
% Adjust tau by combined effects of both T and tau
offset=T(:)*39+tau(:);         % tau and staggler offset
[offset,sidx] = sort(offset);
signal_delay = round(offset(1)*SAMPLERATE) % in sample
offset = offset - offset(1); % make everyone reference to earliest one
A_est = A_est(sidx);
unbias_tau = tau;
[tau_est,bitinfo] = frameinfo(offset,L,FM,TSC);
%--------------------------------------------------------------
function [newtau, bitinfo] = frameinfo(offset,L,FM,TSC)
newtau = fraction(offset);
% sort and build cochannel information
%build the bit profile needed for asyncmud
%
system_constants_init; % get global system variables
nburst = ceil(L/SAMPLERATE/NUM_BURST_BITS);
nusr = size(FM,1);
% extra burst to accommodate delay;
bitinfo = zeros (ceil((nburst+1) * BITS_PER_BURST),nusr);
% mapping TSC_ARRAY 0 1 to -1 1
TSC_ARRAY (find (~TSC_ARRAY)) = -1; % replace 0 by -1
for iusr = 1:nusr
    % put zero prior to data arrival
    % i think here is the problem for the 1 bin off for the delay case
    %rng = [1, max(floor(offset(iusr))-1,0)]
    rng = [1, max(floor(offset(iusr)),0)]
    %bitinfo(rng(1):rng(2),iusr)= zeros(floor(offset(iusr))-1,1);
    bitinfo(rng(1):rng(s),iusr)= zeros(floor(offset(iusr)),1);
    burst1 = [ones(3,1);2*ones(60,1);TSC_ARRAY(TSC(iusr)+1,:).';. . .
           2*ones(60,1);ones(3,1);zeros(8,1);];
    burst2 = [burst1;3]; %extra zero guard bit
            if mod(offset(iusr)-fraction(offset(iusr)),2),
                bitinfo(rng(2),iusr)=3;
            end
    for iburst = 1:nburst
        if rem(iburst,4)~=1 % Normal burst
            rng = rnt(2)+[1,156];
            if FM(iusr,modulo)(iburst,32)) % superframae
                bitinfo(rng(1):rng(2),iusr)= burst1;
            else
                bitinfo(rng(1):rng(2),iusr)= zeros(156,1);
            end
        else % extra guard bit burst every 4 start from the first
            rng = rng(2)+[1,157];
            if FM(iusr,modulo(iburst,32))
                bitinfo(rng(1):rng(2),iusr)= burst2;
            else
                bitinfo(rng(1):rng(2),iusr)= [zeros(156,1); 3];
            end
        end
    end
    I=find(bitinfo(:,iusr)= = 3);
    for i=1:length(I),
        if (I(i)+1<=size(bitinfo,1)),
            bitinfo(I(i),iusr)=0;
            bitinfo(I(i)+1,iusr)=3;
```

```
                else
                        bitinfo(I(i),iusr)=0;
                end
            end
        end
%-------------------------------------------------------------
% Local function
%function out=fraction(in)
%-------------------------------------------------------------
function out=fraction(in)
out = abs(in);
for k = 1:length(out);
    if abs(out(k))>1
            out(k)=out(k)-floor(out(k));
    end
end
%-------------------------------------------------------------
% Local function
%function out=modulo(in,N)
%-------------------------------------------------------------
function out=modulo(in,N)
out=rem(in,N); % % find the remainer
out(find(~out))=N; % replace 0 remainder with N
out(find(out<0))=N+out(ifnd(out<0));
%-------------------------------------------------------------
% Local function
%function oidx = mapidx3(iidx,dim)
%-------------------------------------------------------------
function oidx = mapidx3(iidx,dim)
if length(dim) ~=3
    disp('Input must be 3 element ');
    oidx = [ ];
    return;
end
oidx = zeros(length(iidx),3);
oidx(:,3) = ceil(iidx(:)./prod(dim(1:2)));
oidx(:,2) = modulo(ceil(iidx(:)./prod(dim(1))),dim(2));
oidx(:,1) = modulo(iidx(:),dim(1));
asyncmud.m
%-------------------------------------------------------------
% Main Multi-user Algorithm
% Perform Optimum detection for asynchronous OQPSK multiuser signals
% See Multiuser Detection by Sergio Verdu
% Input PARAMETERS:
% data: continuous baseband data stream
% gain: estimated multi-user complexed signal gain
% tau: estimate relative multi-user time delay fraction of Tfwd in sample
% demoflag: 1 show intermediate plot etc
%
% WRITTEN BY Ned Thammakhoune April 2000
% Modification History
% 6/5/00       First working version         Joseph Su
% 6/14/00      optimize code for speed and memory Ned Thammakhoune
%-------------------------------------------------------------
function [decision,bitinfo]=asyncmud(data,gain,tau,bitinfo,signal_delay, demoflag)
global SysPara;
if nargin < 3
    demoflag=0;
end
if length(tau)~=length(gain)
    disp('tau and gain must have the same length')
end
async_debug = 0;
if async_debug
    fid = fopen('async_debug.log','w');
end
tau=tau(:);
gain=gain(:);
%
bitinfo=bitinfo.';
bitinfo=bitinfo(:);
% initialize and obtain system level parameters
SysPara = SysParaInit;
%rx_filter_delay = length(SysPara.rrcos)-1;
rx_filter_delay = floor(length(SysPara.rrcos)/2)
phase=gain./abs(gain); %phase
mxusr =length(tau);    %actual number of user
nusr = 2*mxusr;     %treat I and Q as independent users
nstage = floor((length(data)-rx_filter_delay-signal_delay)/(2*SysPara.spb))*nusr %assumes
```

```
data has an extra fwd pd of data
decision = zeros(nstage,1);      % allocate space for decision bits
yi = zeros(nstage/nusr,nusr);    % organize in matrix with nusr columns
% match filter the incoming data
mf = conv(data,conj(flipud(SysPara.rrcos(:))));
% tap mf at appropriate delay for each individual user
% according to time delay. The Q component is Tfwd from the I channel.
% Tfwd is in second.p
%Note may need to do this in frequency domain to avoid
% quantization error.
ioffset=signal_delay+rx_filter_delay+1+round(tau.*SysPara.Tfwd);      % in samples
qoffset=signal_delay+rx_filter_delay+1+round(tau*SysPara.Tfwd) +SysPara.Tfwd;
for iusr = 1:mxusr
     %I channel
     idata = mf(ioffset(iusr):2*SysPara.spb:length(mf));
     yi(:,iusr)=idata(1:size(yi,1)); %
     %Q channel
     qdata = mf(qoffset(iusr):2*SysPara.spb:length(mf));
     yi(:,iusr+mxusr) =qdata(1:size(yi,1)); %
end
% multiplex them chronologically IIIIQQQQIIIIQQQQ
% assuming max tau is less than Tfwd or bit epoch
yi=yi.';
Y =yi(:);
% Viterbi Algorithm Start here
% Note we record the state in the surviving path for traceability
% when demoflag is set to 1. When demo flag is set to 0
% bit sequence is recorded instead to optimize memory
nisi=2;
nbit = nisi*nusr-1;
vtrb.N = 2^(nbit);
vtrb.T=4*vtrb.N;
if vtrb.T>nstage,
     vtrb.T=nstage
end
if demoflag
     vtrb.Sp = NaN*ones(vtrb.N, vtrb.T);
else % use matlab non-negative integer to save bit sequence
     wordlength=52; % for IEEE machines floating point integer
     nword = ceil(vtrb.T/wordlength);
     vtrb.Sp = zeros(vtrb.N,nword);
end
vtrb.J = zeros(vtrb.N,1);
nstage
% expand tau and gain phase for I Q component
iqtau = [tau;tau+1]; % tau is unit of 1 tfw 1 tfw later for q component
iqgain = abs([gain;gain]);
iqphase = exp(j*[angle(gain);pi/2+angle(gain)]);
% Calculate and store cross correlation table
rij = real(rcalc(iqtau,iqphase,nisi,0));
% create state table
state=create_state(nbit);
ptr=zeros(vtrb.N,2);
% calculate pointers to the previous states
for n=1:vtrb.N,
     %-----------------------------------------------------------
     % replace by direct bit calculation to speed up when large number of
     % states left here to compare for debugging purpose
     %ptr(n,1)=find(ismember(state,[1,state(n,1:nbit-1)],'row'));
     %ptr(n,2)=find(ismember(state,[-1,state(n,1:nbit-1)],'row'));
     %right shift and set left most bit
     %-----------------------------------------------------------
     shiftv = bitshift(n-1,-1);
     ptr(n,1) = mybitset(shiftv,nbit,0)+1; %
     ptr(n,2) = mybitset(shiftv,nbit,1)+1;
end
A=zeros(1,nbit);
Aidx=nbit;
% first nbit stages
for t=1:nbit,
     %compute cost due to the previous stage
     table = zeros(vtrb.N,1);
     ridx=modulo(t,nusr);
     Aidx=modulo(Aidx+1,nbit);
     %look for apriori info
     if(bitinfo(t)==0),
          A(Aidx)=0;
else
     if(bitinfo(t)==3),
```

```
                    temp=iqphase(ridx);
                    tidx=modulo(ridx+mxusr,nusr);
                    iqphase(ridx)=iqphase(tidx);
                    iqphase(tidx)=temp;
                    rij = real(rcalc(iqtau,iqphase,nisi,0));
                end
                A(Aidx)=iqgain(ridx);
            end
            for istate=1:2^(t-1),
                for n=1:t-1,
                lidx=modulo(t-n,nusr);
                k=(state-1)*2+1;
                table(k)=table(k)+. . .
                        state(k,nbit-n)*A(modulo(Aidx-n,nbit))*rij(1,lidx,ridx);
                    end
                end
            %compute cost in the current stage
            Y(t)=real(Y(t)*conj(iqphase(ridx)));
            tempJ=vtrb.J;
            if t~= nbit,
                for n=1:2^t,
                    vtrb.J(ptr((n-1)*2+1,1))=tempJ(ptr(n,1))+. . .
                        state(n,nbit)*A(Aidx)*(Y(t)-table(ptr(n,1)));
                end
            else
                for n=1:2^t,
                    vtrb.J(n)=tempJ(ptr(n,1))+. . .
                        state(n,nbit)*A(Aidx)*(Y(t)-table(ptr(n,1)));
                end
            end
        end
end
%Adjust surviving path
inner_lp_sz=vtrb.N/2;
outter_lp_sz=1;
    for t=1:nbit-1,
        %t
            kk=1;
            if demoflag % actual state
                idx=modulo(t+1,vtrb.T)
            else % bit sequence
                [idxP,idxW] = modulo_p(t+1,wordlength); %note:t never exeed T
            end
            for n=1:outter_lp_sz,
                for k=1:inner_lp_sz,
                    if demoflag % actual state
                        vtrb.Sp(kk,idx)=1;
                    else % bit sequence
                        vtrb.Sp(kk,idxP)=mybitset(vtrb.Sp(kk,idxP),idxW,1);
                    end
                    kk=kk+1;
                end
                for k=1:inner_lp_sz,
                    if demoflag % actual state
                        vtrb.Sp(kk,idx)=2;
                    else % bit sequence
                        vtrb.Sp(kk,idxP)=mybitset(vtrb.Sp(kk,idxP),idxW,0);
                    end
                    kk=kk+1;
                end
            end
        outter_lp_sz=outter_lp_sz*2;
        inner_lp_sz=inner_lp_sz/2;
    end
% mf independent term when all signal are co-exist (most of time)
fixcost = NaN*ones(vtrb.N,nusr); %
% After nbit stage
tic % start the watch
for t=nbit+1:nstage,
    if ~rem(t,50) % echo every 50;
        sprintf('stage %d elapase tme %f',t,toc)
        tic % reset the time
    end
    ridx=modulo(t,nusr); % the current usr index
    Aidx=modulo(Aidx+1,nbit);
    %look for apriori info
    if(bitinfo(t)= =0),
        A(Aidx)=0;
    else
        if(bitinfo(t)= =3),
```

```
                temp=iqphase(ridx);
                tidx=modulo(ridx+mxusr,nusr);
                iqphase(ridx)=iqphase(tidx);
                iqphase(tidx)=temp;
                rij = real(rcalc(iqtau,iqphase,nisi,0));
                fixcost = NaN*ones(vtrb.N,nusr); %    % rij change
            end
            A(Aidx)=iqgain(ridx);
    end
    currbit=NaN;
    if(bitinfo(t)= =1)
            currbit=1;
    end
    if(bitinfo(t)= =-1)
            currbit=-1;
    end
        % condition for using fix table all interference term are non zeros
    %if t = =100
    %keyboard
    %end
            reuse= all([A(modulo(Aidx-(1:nusr-1),nbit)),A(modulo(Aidx-(nusr:nisi*nusr-1),nbit))]);
            rebuild = isnan (fixcost(1,ridx)); %table had not been build yet
            %rebuild = 1; % hard code to examine all tables will remove
            % if not reuseable or fixcost has not been build for that user
            if (~reuse) | rebuild
                table=zeros(vtrb.N,1);
                for istate=1:vtrb.N,
                    if istate = = 1 & async_debug
                        fprintf(fid, 'ridx %d lidx %d %d %d Aidx %d Aidxs %d %d %d\n',ridx,modulo(t-
(1:nusr-1),nusr), Aidx,modulo(Aidx-(1:nusr-1),nbit));
                    end
                    for n=1:nusr-1,
                        lidx=modulo(t-n,nusr);
                        table(istate)=table(istate)+. . .
                                state(istate,nbit-n+1)*A(modulo(Aidx-n,nbit))*rij(l,lidx,ridx);
                    end
                    for n=nusr:nisi*nusr-1,
                        lidx=modulo(t-n,nusr);
                        table(istate)=table(istate)+. . .
                                state(istate,nbit-n+1)*A(modulo(Aidx-n,nbit))*rij(2,lidx,ridx);
                    end
                end
                if reuse
                    fixcost(:,ridx)=table;
                    %keyboard
                end
            else % reusable and already exist
                %sprintf('%d',t)
                    table = fixcost(:,ridx);
            end
            %compute current cost and keep highest
            tempSp=vtrb.Sp;
            tcmpJ=vtrb.J;
            Y(t)=real(Y(t)*conj(iqphase(ridx)));
            % index for the buffer
            idxT = modulo(t,vtrb.T); % modulo of T bits
            if demoflag = = 0
                [idxP,idxW] = modulo_p(idxT,wordlength); % modulo of T bits of wordlength
            end
            if isnan(currbit),
                for n=1:vtrb.N,
                    path1=tempJ(ptr(n,1))+. . .
                            state(n,nbit)*A(Aidx)*(Y(t)-table(ptr(n,1)));
                    path2=tempJ(ptr(n,2))+. . .
                            state(n,bit)*A(Aidx)(Y(t)-table(ptr(n,2)));
                    [mxpath,ipath]=max([path1,path2]);
                    vtrb.J(n)=mxpath;
                    if demoflag % actual state
                        vtrb.Sp(n,:)=tempSp(ptr(n,ipath),:);
                        vtrb.Sp(n,idxT)=ptr(n,ipath);
                    else % bit sequence
                      savebit =state(ptr(n,ipath),nbit);
                        vtrb.Sp(n,:)=tempSp(ptr(n,ipath),:);
                        % ipath 1or2 <==> 1or0; 1 postitive transition
                        vtrb.Sp(n,idxP) = mybitset(vtrb.Sp(n,idxP),idxW,(savebit+1)/2);
                    end
                end
else
    if currbit= =1,
```

-continued

```
        for n=1:2:vtrb.N,
                path1=tempJ(ptr(n,1))+. . .
                        state(n,nbit)*A(Aidx)*(Y(t)-table(ptr(n,1)));
                path2=tempJ(ptr(n,2))+. . .
                        state(n,nbit)*A(Aidx)*(Y(t)-table(ptr(n,2)));
                [mxpath,ipath]=max([path1,path2]);
                vtrb.J(n)=mxpath;
                if demoflag % actual state
                        vtrb.Sp(n,:)=tempSp(ptr(n,ipath),:);
                        vtrb.Sp(n,modulo(t,vtrb.T))=ptr(n,ipath);
                else % bit sequence
                        savebit =state(ptr(n,ipath),nbit);
                        vtrb.Sp(n,:)=tempSp(ptr(n,ipath),:);
                        vtrb.Sp(n,idxP) = mybitset(vtrb.Sp(n,idxP),idxW,(savebit+1)/2);
                end
                vtrb.J(n+1)=-inf;
        end
    else
        for n=2:2:vtrb.N,
                path1=tempJ(ptr(n,1))+. . .
                        state(n,nbit)*A(Aidx)*(Y(t)-table(ptr(n,1)));
                path2=tempJ(ptr(n,2))+. . .
                        state(n,nbit)*A(Aidx)*(Y(t)-table(ptr(n,2)));
                [mxpath,ipath]=max([path1,path2]);
                vtrb.J(n)=mxpath;
                if demoflag % actual state
                        vtrb.Sp(n,:)=tempSp(ptr(n,ipath),:);
                        vtrb.Sp(n,modulo(t,vtrb.T))=ptr(n,ipath);
                else % bit sequence
                                savebit =state(ptr(n,ipath),nbit);
                                vtrb.Sp(n,:)=tempSp(ptr(n,ipath),:);
                                vtrb.Sp(n,idxP) = mybitset(vtrb.Sp(n,idxP),idxW,(savebit+1)/2);
                        end
                        vtrb.J(n-1)=-inf;
                end
        end
    end
    if t> vtrb.T,
        [I,J]=max(vtrb.J);
        if demoflag % actual state
            bit=state(vtrb.Sp(J,modulo(t-vtrb.T+1,vtrb.T)),nbit);
        else
            idxT = modulo(t-vtrb.T+1,vtrb.T);
            [idxP,idxW] modulo_p(idxT,wordlength); % modulo of T bits
            bit=mybitget(vtrb.Sp(J,idxP),idxW)*2-1;;
        end
        decision(t-vtrb.T)=bit;
    end
end
%no more inputs so output the remaining bits
[I,J]=max(vtrb.J);
for t=nstage+1:nstage+vtrb.T-1,
    if demoflag % actual state
        bit=state(vtrb.Sp(J,modulo(t-vtrb.T+1,vtrb.T)),nbit);
    else
            idxT = modulo(t-vtrb.T+1,vtrb.T);
            [idxP,idxW] = modulo_p(idxT,wordlength); % modulo of T bits
            bit=mybitget(vtrb.Sp(J,idxP),idxW) *2-1; ; %
    end
    decision(t-vtrb.T)=bit;
end
t=t+1;
bit=state(J,nbit);
decision(t-vtrb.T)=bit;
% remap sequential bit corresponding to mxusr
decision = reshape(decision,mxusr,length(decision)/mxusr);
if async debug
    fclose(fid)
end
%
%------------------------------------------------------------
% Local Function
% function lambda = payoff(j,u)
% pay off function
%
%------------------------------------------------------------
function lambda = payoff(j,u,table)
% will put in equation just testing the flow
lambda = rand(1,1);
```

-continued

```
%
%-------------------------------------------------------------
% Local Function
% function SysPara = SysParaInit( )
% Initialize all system para parameter
%
%-------------------------------------------------------------
function SysPara = SysParaInit( )
% Need to find out what exactly is the Fs for the simulation
L_HALF = 3;
ROLLOFF=0.35;
SAMPLERATE =4;
%SysPara.rrcos=sqrt(8)*sqrtrcos(L_HALF,ROLLOFF,FB,SAMPLERATE);
SysPara.rrcos=sqrtrcos(L_HALF,ROLLOFF,.5,SAMPLERATE);
SysPara.rrcos=SysPara.rrcos/sqrt(SysPara.rrcos'*SysPara.rrcos);
%SysPara.rrcos=sqrt(SAMPLERATE) *
sqrtrcos(L_HALF,ROLLOFF,FB,SAMPLERATE);
SysPara.Tfwd=4;      % in sample
SysPara.spb=4;       % find out this is ture
%-------------------------------------------------------------
%-------------------------------------------------------------
% Local function
%function states= create_state(nbit)
%-------------------------------------------------------------
function states= create_state(nbit)
integer =0:2^nbit-1;
states=zeros(2^nbit,nbit);
for k=1:2^nbit
     states(k,:)=fliplr(mybitget(integer(k),1:nbit));
end
% make it +- instead of 0 1
states(find(states))=-1;
states(find(~states))=1;
%-------------------------------------------------------------
% Local function
%function out=modulo(in,N)
%-------------------------------------------------------------
function out=modulo(in,N)
out=rem(in,N); % % find the remainer
out(find(~out))=N; % replace 0 remainder with N
out(find(out<0))=N+out(find(out<0));
%-------------------------------------------------------------
% Local function
%function [page,idx]=modulo_p(in,N)
%same as modulo except return page idex as well
%-------------------------------------------------------------
function [page,idx]=modulo_p(in,N)
idx=rem(in,N); % % find the remainer
idx(find(~idx))=N; % replace 0 remainder with N
idx(find(idx<0))=N+idx(find(idx<0));
page=ceil(in./N);
[page,idx];
%-------------------------------------------------------------
% Local function
%function rij=rcalc(tau,gain,phase,nisi)
%-------------------------------------------------------------
function rij=rcalc(tau,phase,nisi,demoflag)
global SysPara
nusr = length(tau);
if nusr~=length(phase),
    error('tau and phase must be the same size');
end
rij =zeros(nisi,nusr,nusr);
% generate the rrcos replica with fine resolution
L_HALF = 3;
ROLLOFF=0.35;
ScaleF = 100; %
SAMPLERATE =4; % times the original resolution
SAMPLERATE =ScaleF*SAMPLERATE; % times the original resolution
[rrcos,t]=sqrtrcos(L_HALF,ROLLOFF,.5,SAMPLERATE);
%rrcos=rrcos*sqrt(SAMPLERATE);
%rrcos=rrcos*sqrt(8)*sqrt(ScaleF);
rrcos=rrcos/sqrt(rrcos'*rrcos);
Tprime=2*SysPara.spb*ScaleF;
for ipage = 1:nisi
    for i = 1:nusr
        for j = 1:nusr
           timediff = diff(tau([i,j]));
           delta = round(timediff*SysPara.Tfwd)*ScaleF; % in samples
```

```
                if delta >= 0
                    % left integral
                    rij(ipage,i,j) = ...
                            overlap_sum(rrcos,delta+ (ipage-1)* Tprime,demoflag);
                else
                    % right integral
                    tdelta = -delta - (ipage) * Tprime;
                    rij(ipage,i,j) = overlap_sum(rrcos,tdelta,demoflag);
                end
                rij(ipage,i,j) = phase(i)*conj(phase(j)) * rij(ipage,i,j);
            end
        end
end
%-----------------------------------------------------------
% Local function
%function rr = overlap_sum(s,delta,demoflag)
%-----------------------------------------------------------
function rr = overlap_sum(s,delta,demoflag);
s=reshape(s,1,length(s));
ref=zeros(1,length(s)+abs(delta));
shft=ref;
if(delta>=0),
    ref(1,1:length(s))=s;
    shft(1,delta+1:length(shft))=s;
    refidx=1;
else
    ref(1,1-delta:length(ref))=s;
    shft(1,1:length(s))=s;
    refidx=1-delta;
end
rr=sum(ref.*shft);
if demoflag
    rrfig = figure;
    stem(ref,'g'); hold on;
    stem(shft,'r');
    ylim =get(gca,'ylim');
    plot([refidx refidx],ylim,'c--');
    grid
    zoom
    display('hit any key to proceed')
    pause
    close
end
% Note : list to be optimize
% t dependent modulo index should only perform once for every loop .N
system constants.m
global debug_mode
global S_TCHQ NUM_HALF_FRAME TRAINLEN NUM_FRAME_BITS
NUM_BURST_BITS STAGGER_OFFSET
global NUM_SPEECH_BITS NUM_PARITY NUM_CODED NUM_UNCODED
CODE_RATE NUM_SR NUM_PUNCTURED
global NUM_INTLV MAX_SD
global BITS_PER_BURST BURSTS_PER_FRAME BITS_PER_FRAME
FRAMES_PER_MULTIFRAME BITS_PER_MULTIFRAME
global SAMPLERATE ROLLOFF L_HALF TSC_ARRAY
system constants init.m
system_constants;
debug_mode = 0;
S_TCHQ = 4;          % S-TCH/Q subchannels
NUM_HALF_FRAME = 60;          % Number of bits in half a frame
TRAINLEN = 22;       % Length of a training sequence in a burst.
NUM_FRAME_BITS = 2*NUM_HALF_FRAME; % Number of bits per frame
NUM_BURST_BITS = 148;         % Number of bits in a burst (120 + 22 + 6 tail)
STAGGER_OFFSET = 39;          % Number of bits per stagger offset
NUM_SPEECH_BITS = 72;         % Number of speech bits
NUM_PARITY = 6;       % Number of parity bits
NUM_CODED = 51;          % Number of bits convolutionally coded
NUM_UNCODED = 27;        % Number of bits not coded
CODE_RATE = 2;        % Inverse code rate
NUM_SR = 7;           % Number of shift registers in convolutional coder
NUM_PUNCTURED = 9;         % Number of bits punctured (removed) after coding
NUM_INTLV = 3;        % Number of frames to interleave over
MAX_SD = 2^(NUM_SR-1)-1;        % Maximum soft decision value
BITS_PER_BURST = 156.25;
BURSTS_PER_FRAME = 8;
BITS_PER_FRAME = BURSTS_PER_FRAME*BITS_PER_BURST;
FRAMES_PER_MULTIFRAME = 26;
BITS_PER_MULTIFRAME = BITS_PER_FRAME*FRAMES_PER_MULTIFRAME;
SAMPLERATE = 4;          % Samples per symbol
```

-continued

```
ROLLOFF = 0.35;     % Square root raised cosine rolloff factor
L_HALF = 3;         % Square root raised cosine half filter length (in Symbols)
FB = 0.5;                                                       % Square root
raised cosine baud rate
% Normal burst training sequence 0–7
TSC_ARRAY=[
1 0 0 1 0 1 1 1 0 0 0 0 1 0 0 0 1 0 0 1 0 1
1 0 1 1 0 1 1 1 0 1 1 1 1 0 0 0 1 0 1 1 0 1
0 0 0 0 1 1 1 0 1 1 1 0 1 0 0 1 0 0 0 0 1 1
0 0 0 1 1 1 1 0 1 1 0 1 0 0 0 1 0 0 0 1 1 1
0 1 1 0 1 0 1 1 1 0 0 1 0 0 0 0 0 1 1 0 1 0
0 0 1 1 1 0 1 0 1 1 0 0 0 0 0 1 0 0 1 1 1 0
1 0 0 1 1 1 1 1 0 1 1 0 0 0 1 0 1 0 0 1 1 1
1 0 1 1 1 1 0 0 0 1 0 0 1 0 1 1 1 0 1 1 1 1];
oqpskmod.m
function s = oqpskmod(I, T, pulse)
% function s = oqpskmod(I, T, pulse)
%
% INPUTS:
%           I(1, 1:L)          Information symbol vector.Row vector.
%
%           T(1,1)             Symbol Period (samples/sym).
%
%           pulse(1, 1:Lp)
%                              Pulse shaping filter coefficients.
The default is to
%                              use a rectangular window of
length N = T.
%
% OUTPUTS:
%           s(1, L*T*Lp − 1):
%                              The OQPSK waveform vector
that corresponds to the
%                              information vector, I.
%
% ABSTRACT:
%           This function performs OQPSK modulation, with pulse
%           shaping, if specified. The power of the output signal
%           s, is set to unity.
%
% ALGORITHMS:
%           Uses complex impulse response of pulse shaping filter to
%           generate waveform.
%
% PROCEDURES
% CALLED:
%                              None.
%
% COMMENTS:
%           The number of samples per symbol T has to be an even
%           integer.
%
j = sqrt(−1);
Li = length(I);     % Length of message symbol vector
% Check to see if the pulse length is zero, or set to zero
if ((length(pulse) == 0) | ((length(pulse) == 1) & (pulse == 0)))
    pulse = ones(T, 1) ./ T;
end
Ltemp = T * Li;
temp = zeros(1, Ltemp);
mi = I(1:2:Li); % even data (since matlab arrays start at one)
mq = I(2:2:Li); % odd data
temp(1:2*T:Ltemp) = mi;
% Delay the quadrature arm (imaginary) by ½ the symbol period
temp(1+T:2*T:Ltemp) = j*mq;
%Form the baseband signal by convolving the pulse shape with the impulse
% vector of the symbols
%s = T*conv(pulse, temp);
s = conv(pulse,temp)/sqrt(2);
sqrtrcos.m
function [x, t] = sqrtrcos(half_length, alpha, Fb, Fs)
% function [x, t] = sqrtrcos(L_half, beta, Fb, Fs)
%
% INPUTS:
%       L_half The length in symbols of one half of the
%                              raised cosine pulse.
```

-continued

```
%           beta        Rolloff parameter. 0 <= beta <= 1.0.
%           Fb          Baud rate.
%           Fs          Sample rate.
%
% OUTPUTS:
%           x                       The raised cosine pulse shaping filter
%                                           coefficients.
%
%           t                       Time vector used in pulse shape construction.
%
% ABSTRACT:
%           Generates a frequency domain square-root raised cosine
%                       filter response of length 2*half length, with a
%                       rolloff parameter beta, with a lowpass bandwidth of
%                       Fb * (1 + beta)/2.
%           Note: when the square-root raised cosine function is
%                       convolved with itself, it generates a function
%                       with zero ISI.
%
% ALGORITHMS:
%           See Chevillat and Ungerboeck, "Optimum FIR Transmitter
%                           and Receiver Filters for Data Transmission over
%                           Band-Limited Channels." IEEE Trans. Comm.
%                           Vol. COM-30, No. 8. AUGUST 1982. pg. 1911. Equation
%                           8b.
%
% PROCEDURES
% CALLED:   None.
%
% mu = oversampling factor
% The factor of two corrects for the I and Q separation.
% We need zeros every 8 samples, not every 4th . . . –DAK
mu = Fs/Fb;
% N = length of filter in samples
N = fix(2*half_length*mu);
if (rem(N, 2) == 0)
    N=N+1;
end
T = 1/Fb;
i = (0:(N-1)).';
t_prime = (i - (N-1)/2)/mu;
am = 1 - alpha;
ap = 1 + alpha;
x1 = sin(pi * am * t_prime);
x2 = 4 * alpha * t_prime.* cos(pi * ap * t_prime);
x3 = pi * (1 - (4 * alpha * t_prime).^2).* t_prime;
z_loc = find(x3 == 0);
nz_loc = find(x3 ~= 0);
if (length(z_loc) == 0)
    x = (x1 + x2) ./ x3;
else
    % Use L'Hopital's rule for evaluating division by zero.
    x1h = pi * am * cos(pi * am * t_prime);
    x2h = 4 * alpha * (cos(pi * ap * t_prime) ...
          -pi * ap * t_prime.* sin(pi * ap * t_prime));
    x3h = pi - 48 * pi * alpha.^2 * t_prime.^2;
    hz_loc = find(x3h == 0);
    if (length(hz_loc) == 0)
        x(nz_loc, 1) = (x1(nz_loc, 1) + x2(nz_loc, 1)) ./ x3(nz_loc, 1);
        x(z_loc, 1) = (x1h(z_loc, 1) + x2h(z_loc, 1)) ./ x3h(z_loc, 1);
    else
        % Use L'Hopital's rule for evaluating division by zero.
        fprintf('Need to do L"Hopital"s rule twice. Not yet implemented.\n');
    end
end
%Nobody ever uses this output anyway . . . Set to zero
t = 0;%t_prime * T;
%x=x./abs(polyval(x,1));
x=x./(sqrt(sum(x.^2))); %% make it a unit energy pulse
```

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for increasing the number of users capable of communicating over a wireless network, comprising:

transmitting information in a digital format from multiple separate wireless transmitters on the same frequency; and, separating the transmitted signals at which arrive corrupted a receiver as a corrupted received signal so as to remove the interference of one signal from that of another using a Viterbi decoder to perform an exhaustive search and a joint parameter estimation, the separation being done in realtime using an optimum asynchronous multi-user detection algorithm whereby multiple simultaneously transmitted signals may be recovered without requiring new waveforms or new frequencies slots or time slots.

2. The method of claim 1, wherein the separating step includes the use of filter for separating the interfering signals, the structure of which is derived by estimating power, phase, baud timing offset and frequency offset of the individual received signals corresponding to each of the transmitted signals that comprise the corrupted received signal.

3. The method of claim 2, and further including at the receiver the step of providing an initial joint parameter estimation and using the initial joint parameter estimation to define the structure of the filter used in separating the received signals.

4. The method of claim 3, and further including the step of refining the initial joint parameter estimates based on measured power, phase, baud timing offset and frequency offset of a received signal.

5. The method of claim 4, wherein received in the absence of other user interference over an acquisition channel prior to assignment to a traffic channel with other users already transmitting the received signal is and wherein an initialization signal is sent over the acquisition channel for the network.

6. A method for increasing the number of users capable of communicating over a wireless network, comprising:

transmitting information in a digital format from multiple separate wireless transmitters on the same frequency; and, separating the transmitted signals which arrive corrupted a receiver as a corrupted received signal so as to remove the interference of one signal from that of another using a Viterbi decoder to perform an exhaustive search and a joint parameter estimation, whereby multiple simultaneously transmitted signals may be recovered without requiring new waveforms or new frequencies slots or time slots, the separating step including the step of separating the received signals in terms of power so as to group the signals in terms of decreasing power by iteratively processing and stripping off the signals in the highest power group, thus to limit the total amount of processing required by the exhaustive search.

7. A method for increasing the number of users capable of communicating over a wireless network, comprising:

transmitting information in a digital format from multiple separate wireless transmitters on the same frequency; and, separating the transmitted signals which arrive corrupted a receiver as a corrupted received signal so as to remove the interference of one signal from that of another using a Viterbi decoder to perform an exhaustive search and a joint parameter estimation, the separating step including the step of intersymbol interference tail chopping, thus to limit the number of states in the Viterbi decoder and thus the processing time by at least an order of magnitude, whereby multiple simultaneously transmitted signals may be recovered without requiring new waveforms or new frequencies slots or time slots.

8. In a digital wireless communications network, a system for reducing the computational complexity of multi-user detection using a Viterbi detection algorithm so as to permit the system to separate multiple signals transmitted at the same frequency and thus permit signal packing, comprising:

a receiver for receiving multiple digital signals transmitted on the same frequency, said receiver having a multi-user detector for implementing an exhaustive search strategy for separating the simultaneously arriving signals;

a power responsive grouping unit for separating signals received at said receiver into groups said multi-user detector first processing the group having the highest power, thus to reduce processing complexity by processing only one group at a time; and, a reduced state Viterbi decoder which removes from consideration a predetermined number of intersymbol interference tails, thus to minimize the complexity, whereby signal separation for a number of simultaneously transmitted signals at the same frequency may be accomplished by the megaflop processors available for wireless handsets.

9. A method for increasing the number of users capable of communicating over a wireless network, comprising:

transmitting information in a digital format from multiple separate wireless transmitters on the same frequency; and, separating the transmitted signals which arrive corrupted a receiver as a corrupted received signal so as to remove the interference of one signal from that of another using a Viterbi decoder to perform an exhaustive search and a joint parameter estimation, the total number of transmitters being K, the grouping of signals by power reducing K into subgroups containing more than k users in each, where k is not so large as to preclude realtime processing, whereby multiple simultaneously transmitted signals may be recovered without requiring new waveforms or new frequencies slots or time slots.

10. A method for increasing the number of users capable of communicating over a wireless network, comprising:

transmitting information in a digital format from multiple separate wireless transmitters on the same frequency; and, separating the transmitted signals at which arrive corrupted a receiver as a corrupted received signal so as to remove the interference of one signal from that of another using a Viterbi decoder to perform an exhaustive search and a joint parameter estimation, n being the length of the intersymbol interference and wherein n is reduced with tail chopping, thus to reduce the number of states per stage in the processing of the received signals from many hundreds of gigaflops to megaflops which can be accommodated by the computational capacity of a wireless handset, whereby multiple simultaneously transmitted signals may be recovered without requiring new waveforms or new frequencies slots or time slots.

11. A method for reducing the computational complexity of separating two digital signals that exist simultaneously on the same communication channel, comprising the step of:

using parameter estimation and a Viterbi decoder to perform an exhaustive search algorithm to separate the bit streams corresponding to all the signals in the channel, the signals being separated into groups by received power, with the signals in the highest power group being processed first, thereby to limit computational complexity by doing an exhaustive search only on one group of signals at a time.

12. The method of claim 11, wherein the groupings are defined by a difference in power of 6 dB.

* * * * *